(12) United States Patent
Lim

(10) Patent No.: US 12,553,587 B2
(45) Date of Patent: Feb. 17, 2026

(54) OPTICAL MEMBER, LIGHTING DEVICE AND VEHICLE LAMP HAVING SAME

(71) Applicant: LG INNOTEK CO., LTD., Seoul (KR)

(72) Inventor: Eay Jin Lim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 10 days.

(21) Appl. No.: 18/681,177

(22) PCT Filed: Aug. 18, 2022

(86) PCT No.: PCT/KR2022/012306
§ 371 (c)(1),
(2) Date: Feb. 5, 2024

(87) PCT Pub. No.: WO2023/022526
PCT Pub. Date: Feb. 23, 2023

(65) Prior Publication Data
US 2024/0280237 A1    Aug. 22, 2024

(30) Foreign Application Priority Data

Aug. 19, 2021    (KR) .................. 10-2021-0109619

(51) Int. Cl.
*F21S 43/40*    (2018.01)
*F21S 43/14*    (2018.01)
(Continued)

(52) U.S. Cl.
CPC .............. *F21S 43/40* (2018.01); *F21S 43/14* (2018.01); *F21S 43/145* (2018.01); *F21S 43/15* (2018.01);
(Continued)

(58) Field of Classification Search
CPC ........... F21S 43/26211; F21S 43/26241; F21S 43/26421; F21S 43/26411; F21S 43/26;
(Continued)

(56) References Cited

U.S. PATENT DOCUMENTS 4,305,116 A * 12/1981 Huber ................ F21S 43/26
362/311.06
6,285,426 B1 * 9/2001 Akins ............... G02F 1/133553
349/67
(Continued)

FOREIGN PATENT DOCUMENTS

KR       10-0898100       5/2009
KR    10-2010-0135295     12/2010
(Continued)

OTHER PUBLICATIONS

Machine translation of KR 20180029156A, author: Lim Jae Ik, published Mar. 20, 2018 (Year: 2018).*

(Continued)

*Primary Examiner* — William N Harris
(74) *Attorney, Agent, or Firm* — KED & ASSOCIATES, LLP

(57) ABSTRACT

The lighting device disclosed at an embodiment of the invention comprises a substrate; a light source disposed on the substrate; a resin layer disposed on the substrate; and an optical member disposed on the resin layer, wherein the optical member includes a base layer, a pattern layer disposed on the base layer, and a reflective layer disposed on the pattern layer, and a pattern of the pattern layer includes a first surface and a second surface having a predetermined angle with respect to the first surface, the reflective layer is disposed on the first surface, and a difference between a intensity of light emitted to an outside through the first surface and the second surface may be 5 times or more.

13 Claims, 15 Drawing Sheets

(51) Int. Cl.
  *F21S 43/145*  (2018.01)
  *F21S 43/15*  (2018.01)
  *F21S 43/16*  (2018.01)
  *F21S 43/19*  (2018.01)
  *F21S 43/20*  (2018.01)
  *F21S 43/239*  (2018.01)
  *F21S 43/245*  (2018.01)
  *F21S 43/249*  (2018.01)
  *F21S 43/31*  (2018.01)
  *F21S 43/37*  (2018.01)
  *F21V 8/00*  (2006.01)
  *F21Y 113/00*  (2016.01)
  *F21Y 115/10*  (2016.01)

(52) U.S. Cl.
  CPC .............. *F21S 43/16* (2018.01); *F21S 43/19* (2018.01); *F21S 43/195* (2018.01); *F21S 43/239* (2018.01); *F21S 43/245* (2018.01); *F21S 43/249* (2018.01); *F21S 43/26211* (2024.05); *F21S 43/2641* (2024.05); *F21S 43/26411* (2024.05); *F21S 43/28135* (2024.05); *F21S 43/31* (2018.01); *F21S 43/37* (2018.01); *F21S 43/402* (2024.05); *G02B 6/0036* (2013.01); *G02B 6/0038* (2013.01); *G02B 6/0053* (2013.01); *G02B 6/0055* (2013.01); *G02B 6/0065* (2013.01); *F21Y 2113/00* (2013.01); *F21Y 2115/10* (2016.08)

(58) Field of Classification Search
  CPC .. G02B 6/0036; G02B 6/0055; G02B 6/0058; G02B 6/0003; G02B 6/0038
  See application file for complete search history.

(56) References Cited

U.S. PATENT DOCUMENTS

| | | | |
|---|---|---|---|
| 6,724,535 B1* | 4/2004 | Clabburn | G02B 5/0231 359/615 |
| 10,139,054 B2 | 11/2018 | Park et al. | |
| 10,191,329 B2* | 1/2019 | Choi | G02B 5/09 |
| 2005/0078374 A1* | 4/2005 | Taira | G02B 5/3058 359/569 |
| 2009/0161385 A1* | 6/2009 | Parker | G02B 6/0061 362/617 |
| 2010/0027294 A1 | 2/2010 | Lee et al. | |
| 2011/0128470 A1 | 6/2011 | Yorita et al. | |
| 2011/0176325 A1 | 7/2011 | Sherman et al. | |
| 2015/0036336 A1 | 2/2015 | Yang et al. | |
| 2017/0159905 A1* | 6/2017 | Shido | F21S 43/31 |
| 2017/0315283 A1* | 11/2017 | Lee | G02B 6/005 |
| 2018/0245748 A1* | 8/2018 | Park | F21K 9/61 |
| 2018/0364543 A1 | 12/2018 | Whitehead et al. | |

FOREIGN PATENT DOCUMENTS

| | | |
|---|---|---|
| KR | 10-2011-0091302 | 8/2011 |
| KR | 10-2013-0102715 | 9/2013 |
| KR | 10-2018-0029156 | 3/2018 |
| KR | 10-2018-0087270 | 8/2018 |
| KR | 10-2018-0134825 | 12/2018 |

OTHER PUBLICATIONS

International Search Report dated Dec. 7, 2022 issued in Application No. PCT/KR2022/012306.

* cited by examiner

[FIG. 1]
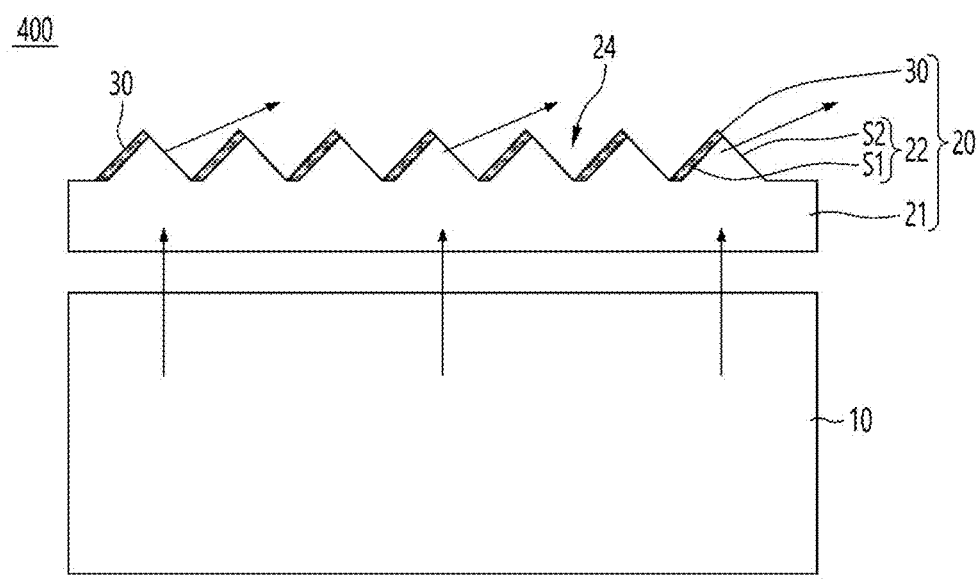

[FIG. 2]
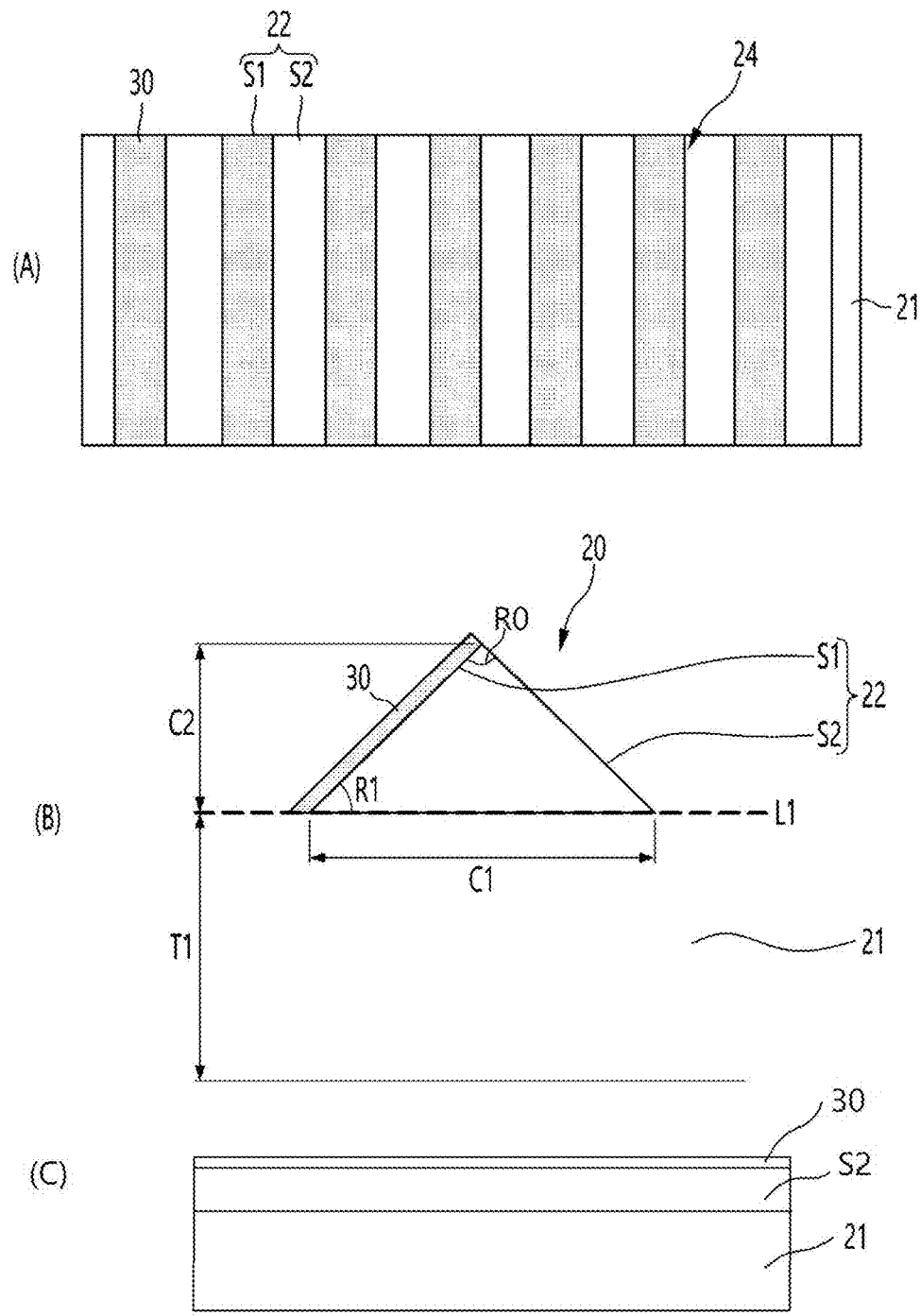

[FIG. 3]
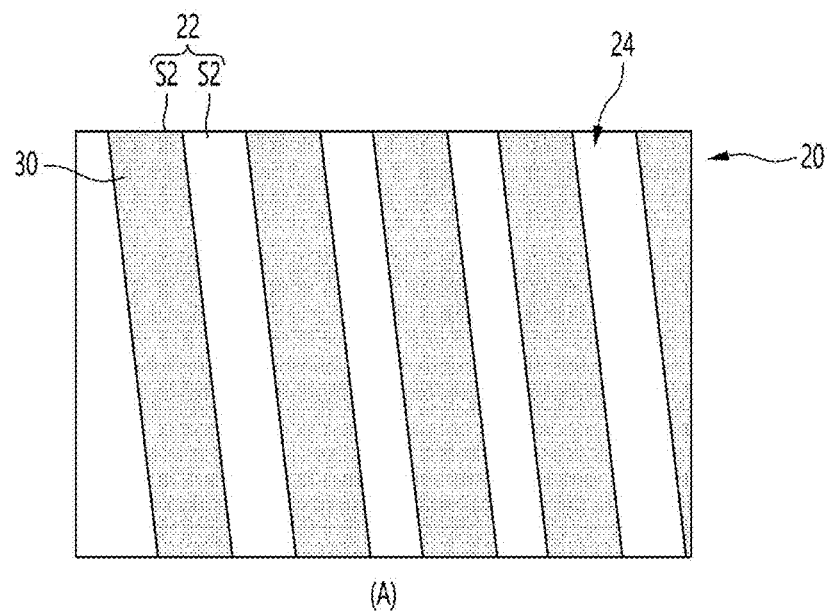
(A)
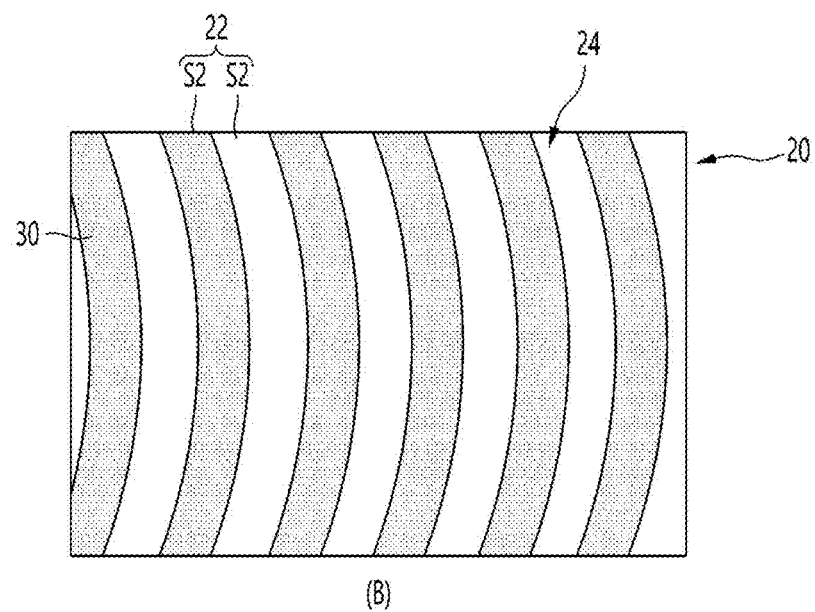
(B)

[FIG. 4]
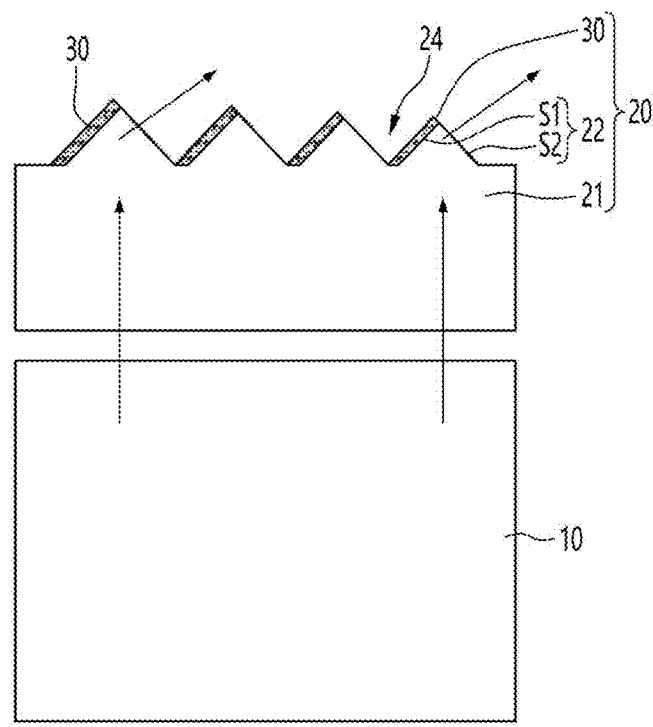
[FIG. 5]
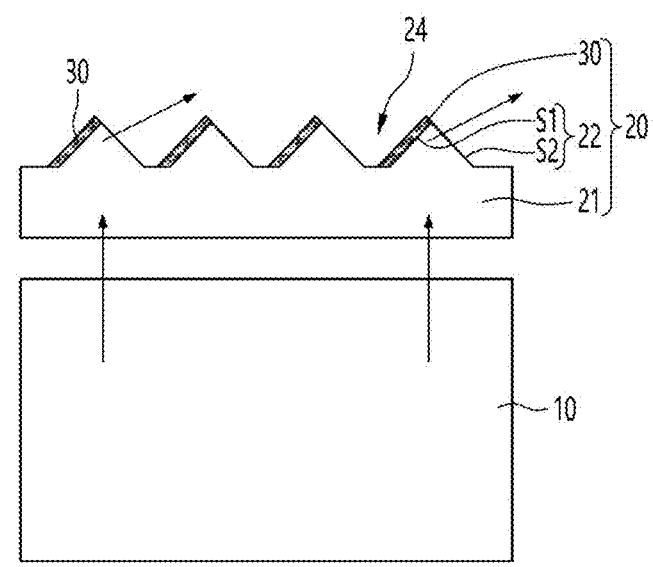

【FIG. 6】
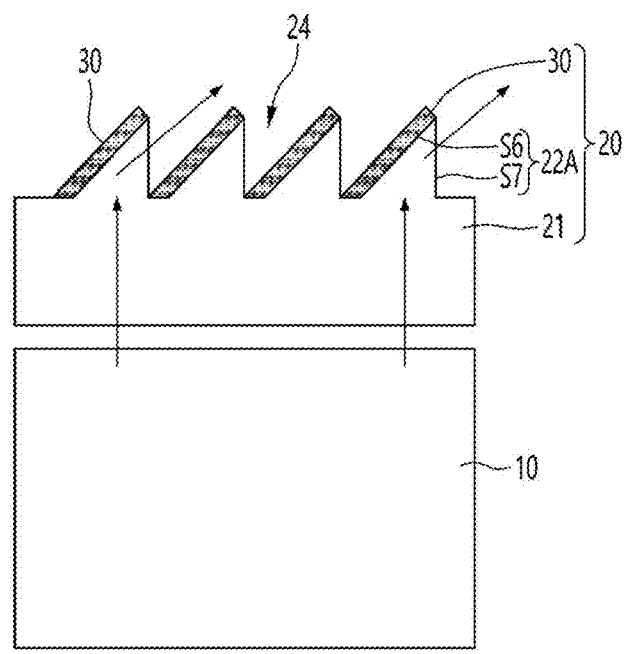
(A)
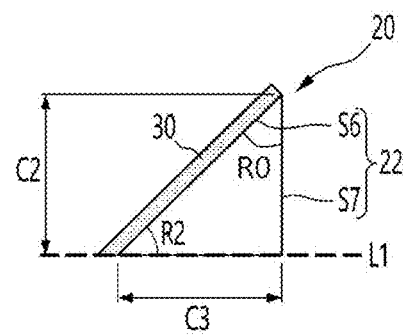
(B)

[FIG. 7]
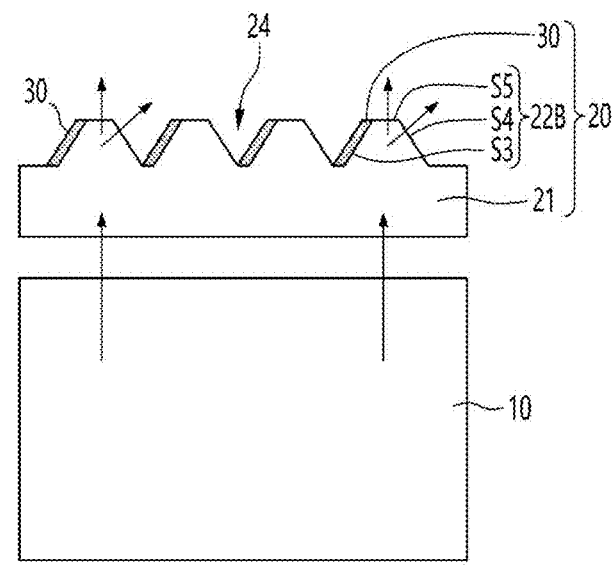
[FIG. 8]
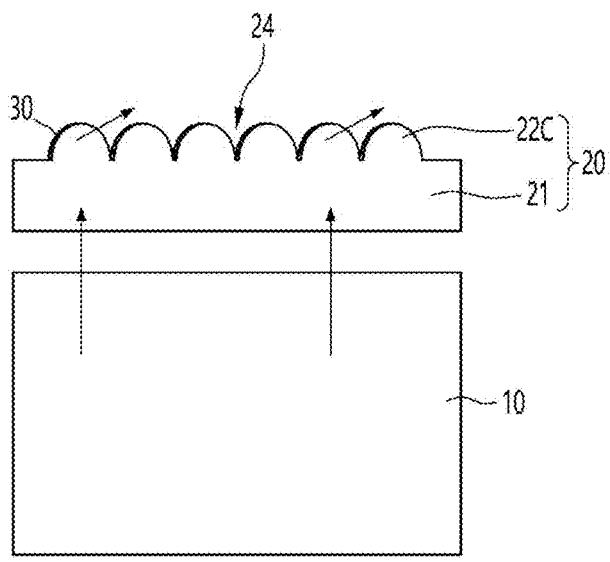

[FIG. 9]
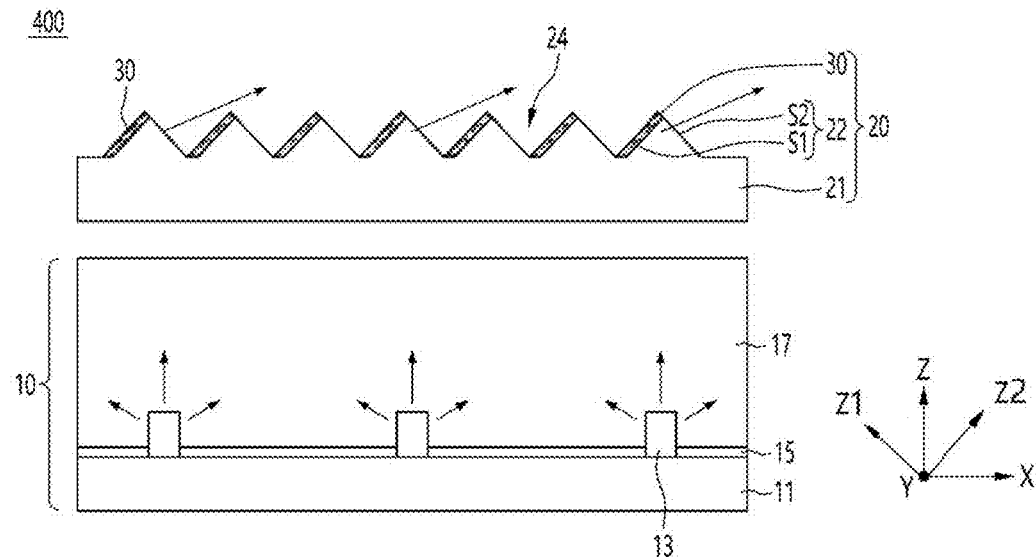
[FIG. 10]
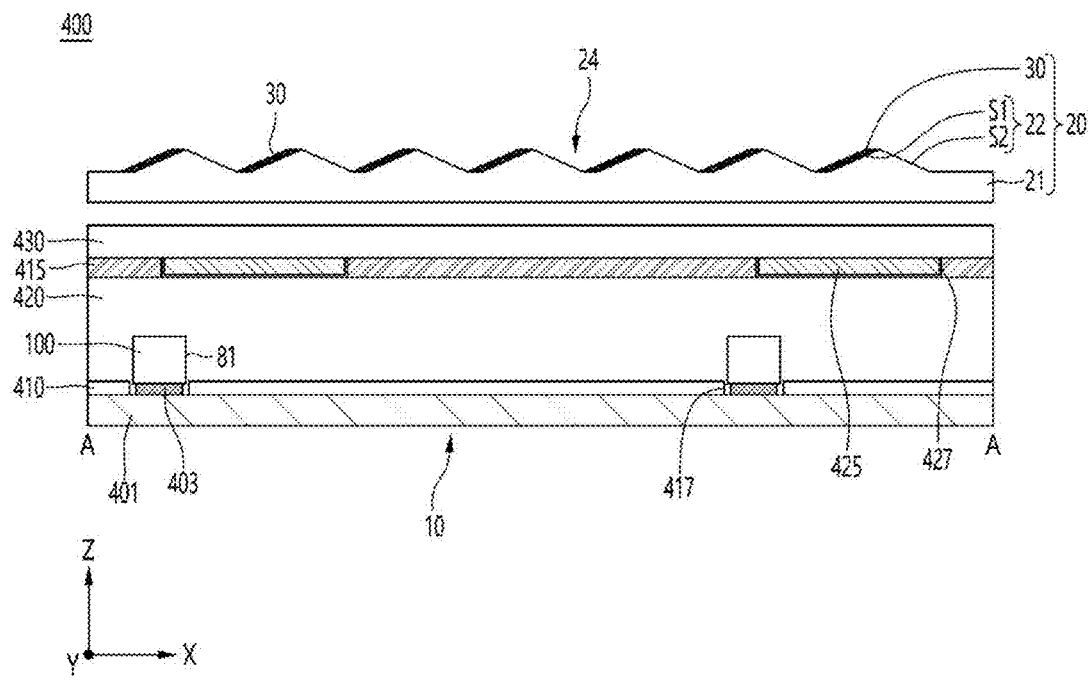

[FIG. 11]
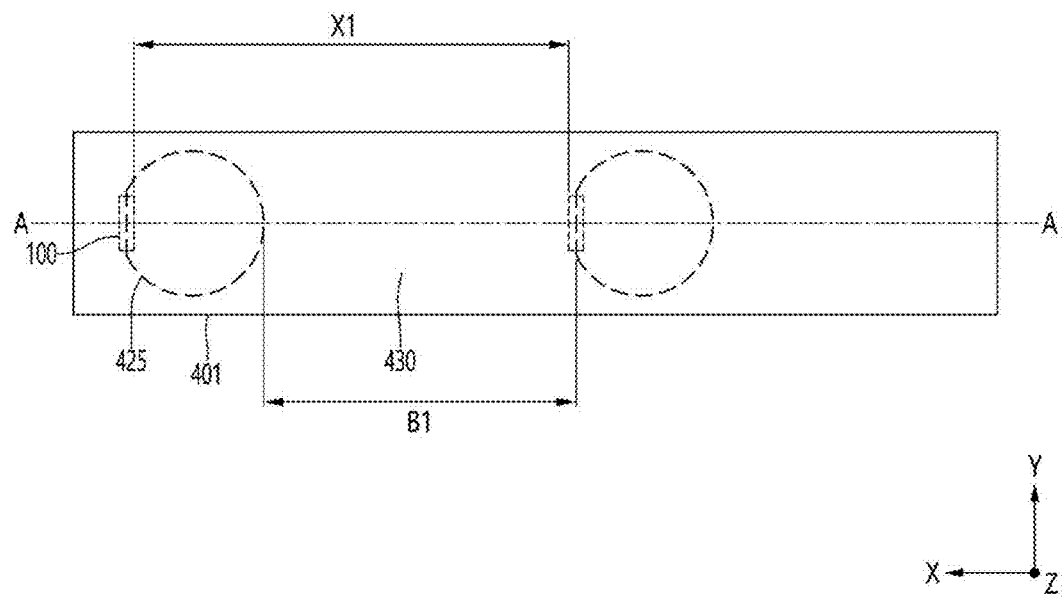
[FIG. 12]
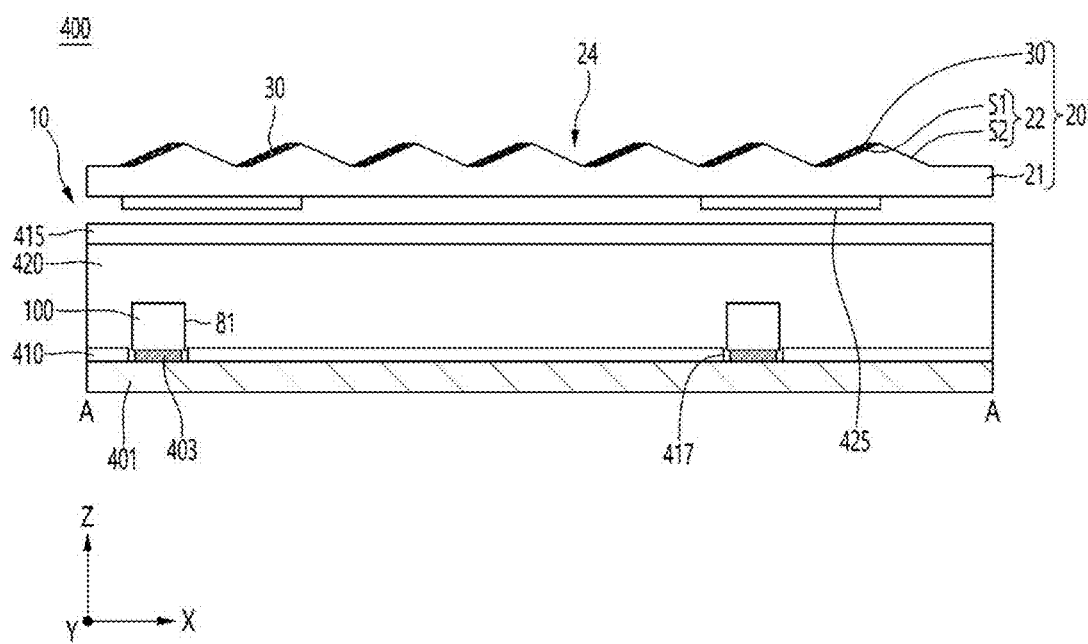

[FIG. 13]
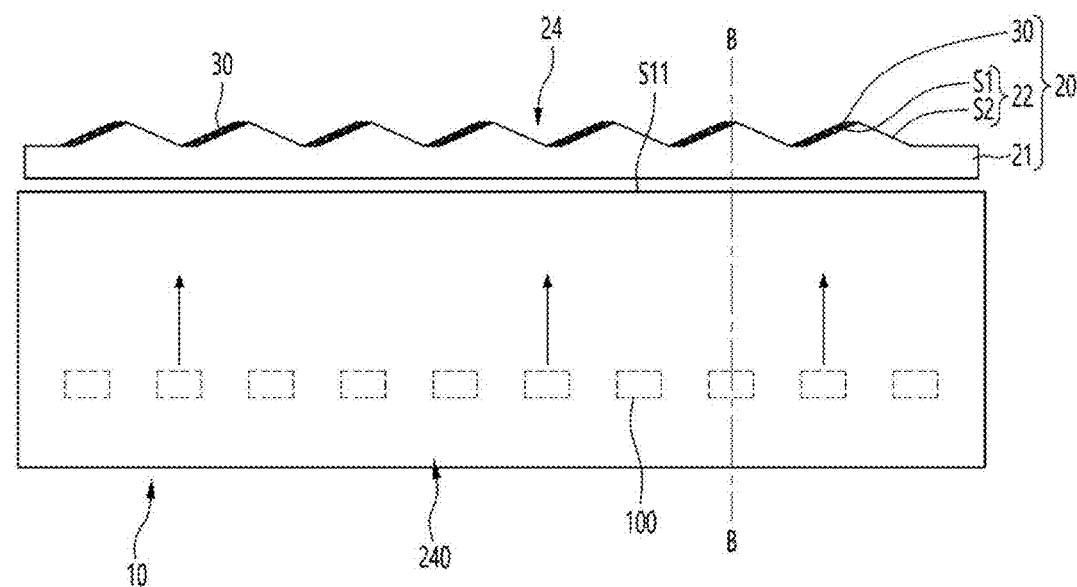
[FIG. 14]
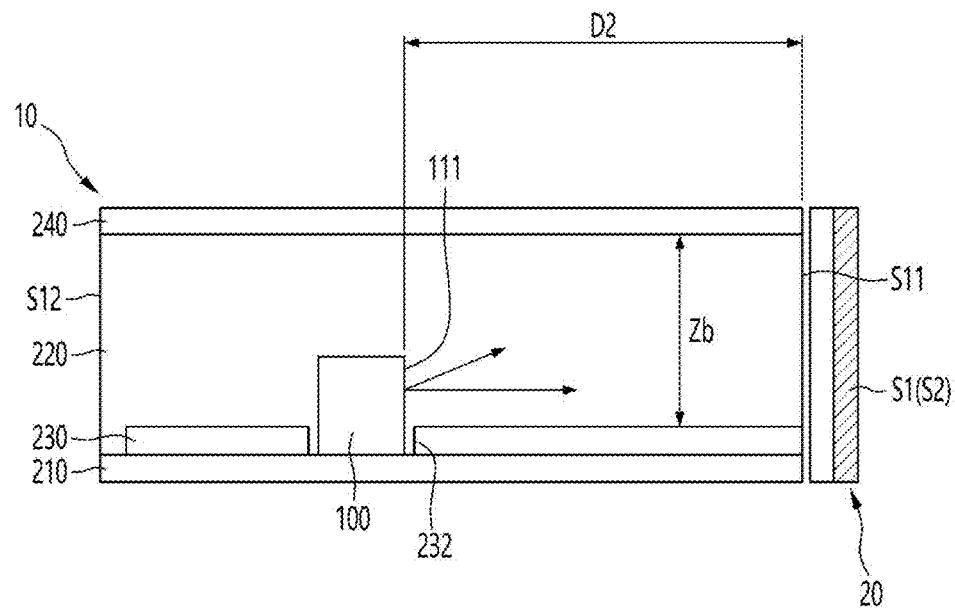

[FIG. 15]
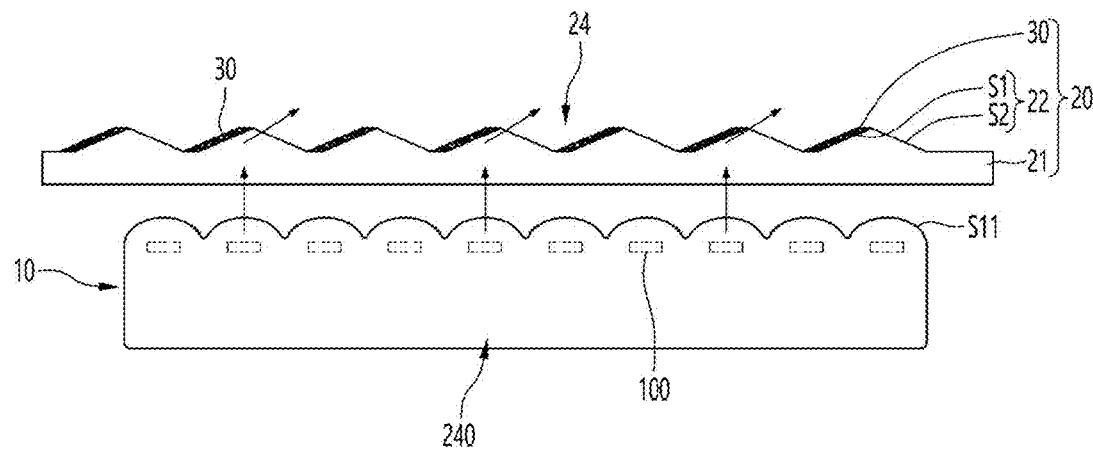
[FIG. 16a]
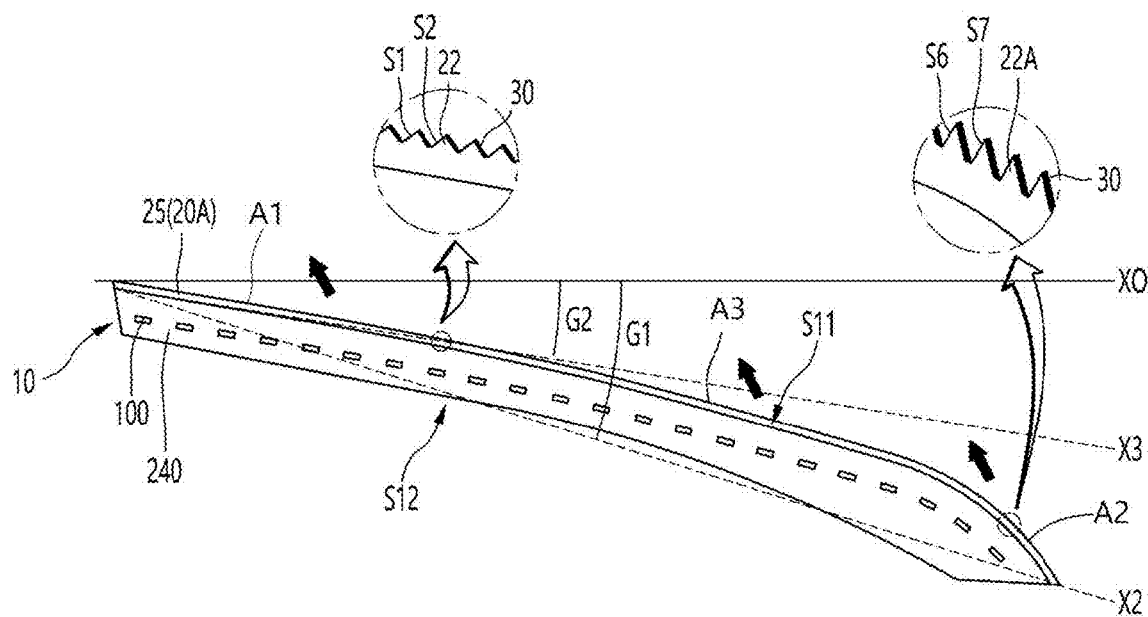

[FIG. 16b]
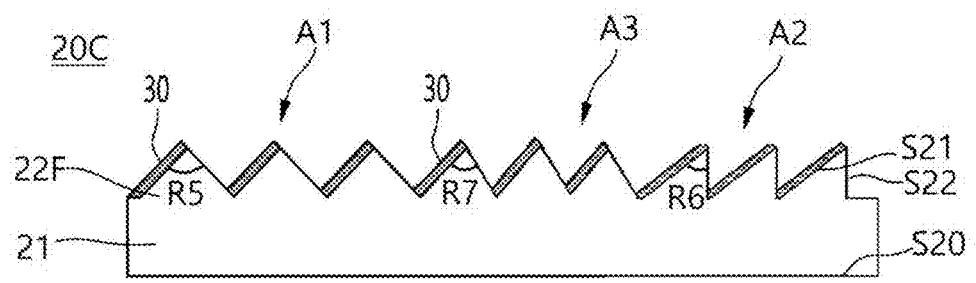
[FIG. 17]
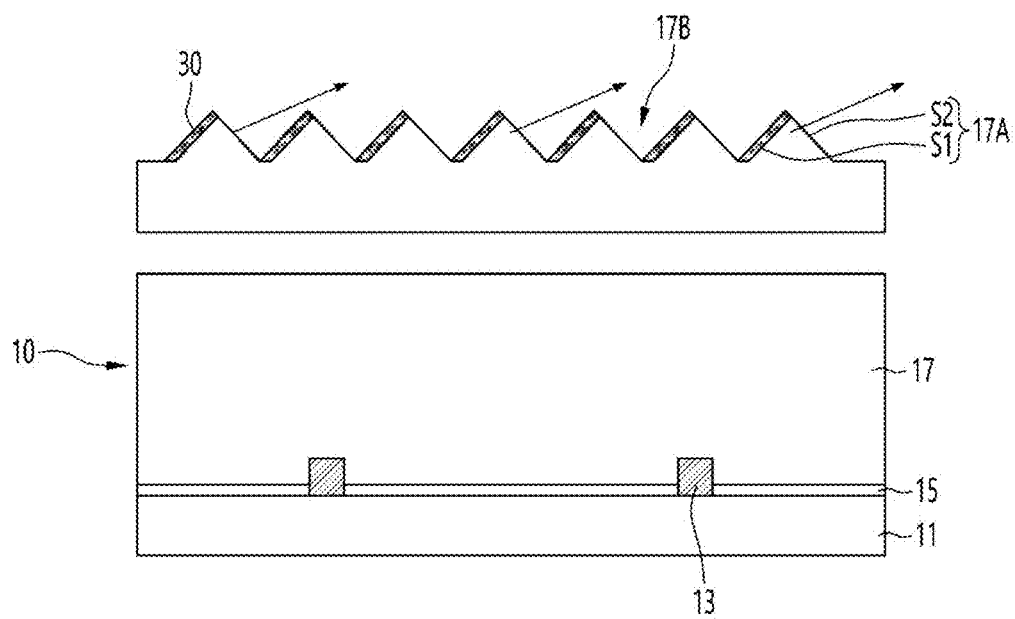

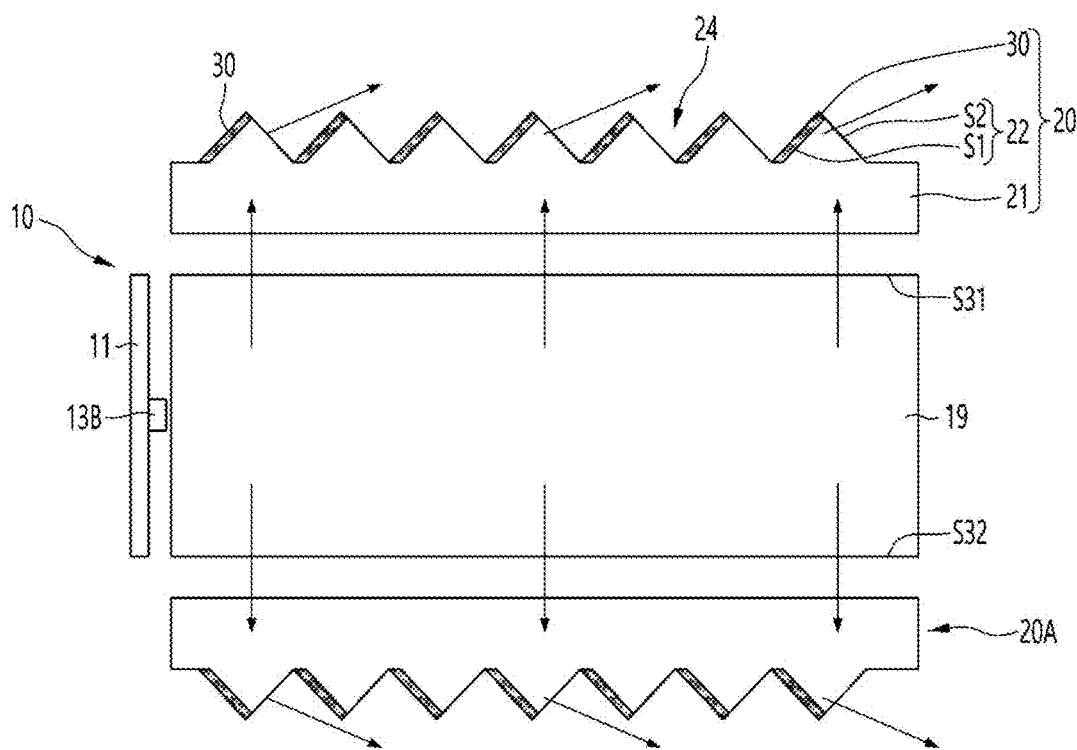
[FIG. 18]

[FIG. 19]
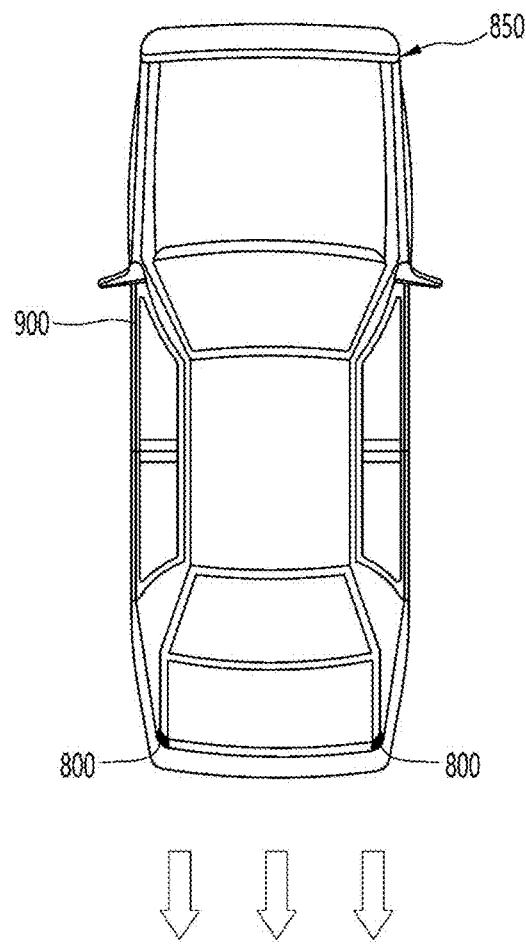
[FIG. 20]
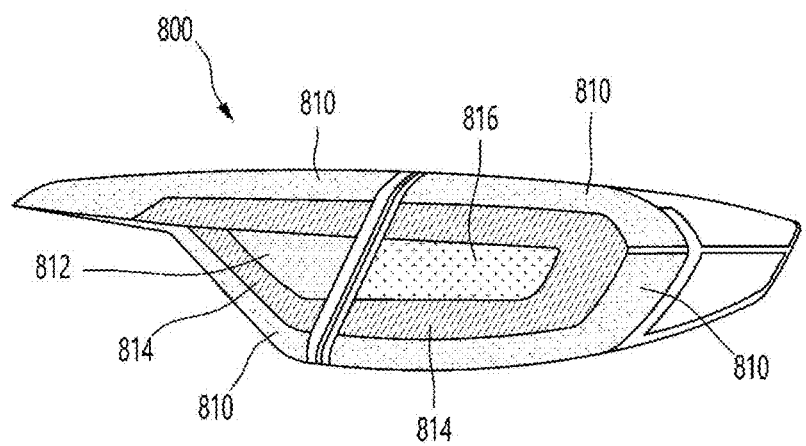

[FIG. 21]
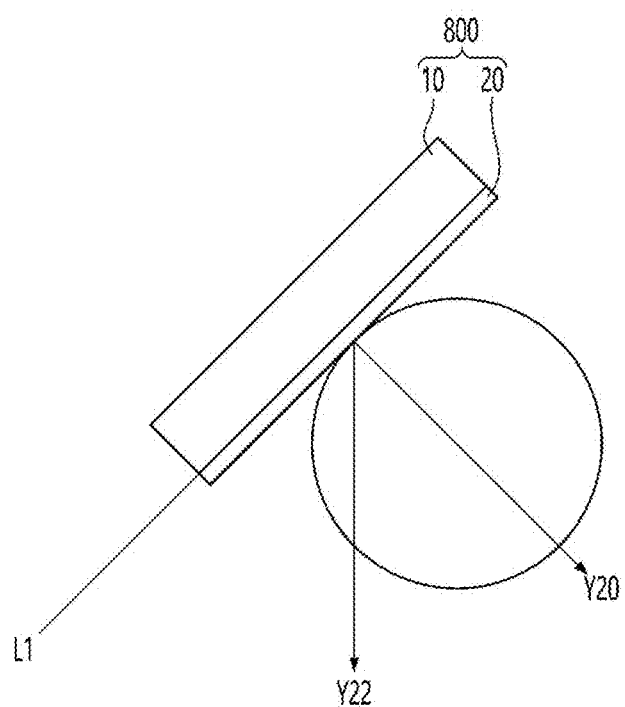

[FIG. 22]
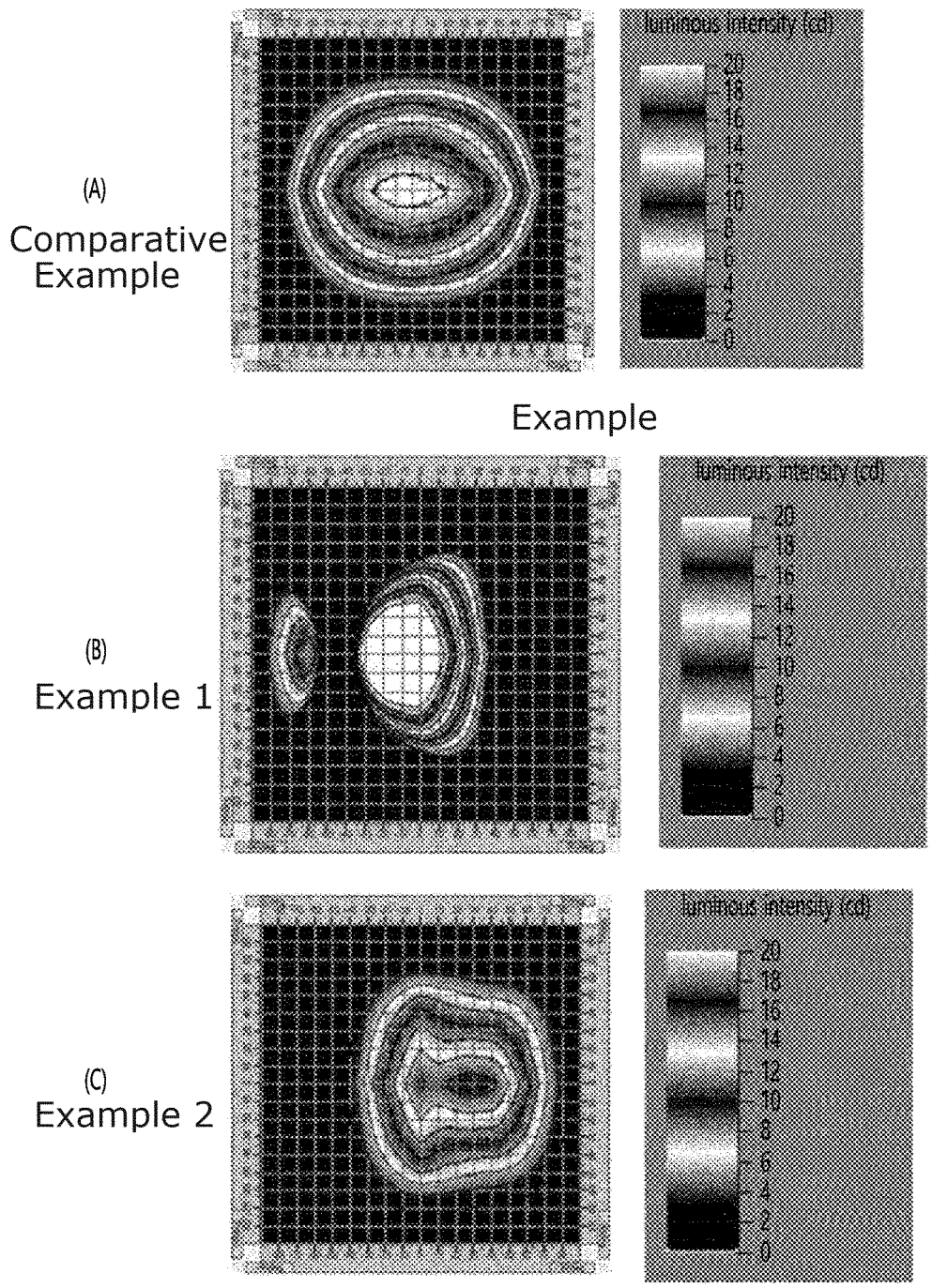
(A) Comparative Example
Example
(B) Example 1
(C) Example 2

OPTICAL MEMBER, LIGHTING DEVICE AND VEHICLE LAMP HAVING SAME

CROSS-REFERENCE TO RELATED PATENT APPLICATIONS

This application is a U.S. National Stage Application under 35 U.S.C. § 371 of PCT Application No. PCT/KR2022/012306, filed Aug. 18, 2022, which claims priority to Korean Patent Application No. 10-2021-0109619, filed Aug. 19, 2021, whose entire disclosures are hereby incorporated by reference.

TECHNICAL FIELD

An embodiment of the invention relates to an optical member having reflective and transmitting patterns and a lighting device having the same. An embodiment of the invention relates to a light unit or vehicle lamp having a lighting device.

BACKGROUND ART

A light emitting diode (LED) has advantages such as low power consumption, semi-permanent life, fast response speed, safety, and environmental friendliness compared to conventional light sources such as fluorescent lamps and incandescent lamps. These light emitting diodes are applied to various display devices, various lighting devices such as indoor or outdoor lights. Recently, as a vehicle light source, a lamp employing a light emitting diode has been proposed. Compared to incandescent lamps, light emitting diodes have an advantage in that they consume less power. Since the light emitting diode has a small size, it may increase the design freedom of the lamp, and it is economical due to its semi-permanent life.

DISCLOSURE

Technical Problem

An embodiment of the invention may provide an optical member in which patterns are arranged, each pattern having a plurality of reflective surfaces and a plurality of transmission surfaces for incident light, and a lighting device having the same. An embodiment of the invention may provide an optical member having a first inclined surface and a reflective layer on one side of the pattern and a transparent surface on the other side of the pattern, and a lighting device having the same. An embodiment of the present invention may provide an optical member having at least one of at least two inclined surfaces facing each other that form each of a plurality of patterns having a reflectance higher than a transmittance, and at least the other having a transmittance higher than a reflectance, and a lighting device having the same. An embodiment of the invention may provide an optical member having patterns respectively having an inclined surface passing through an incident point light source, a line light source, or a surface light source and an inclined surface reflecting the same, and a lighting device having the same.

An embodiment of the invention may provide an optical member that provides different images according to whether the light is turned on or not, and a lighting device having the same. An embodiment of the invention may provide an optical member that provides light having the highest luminous intensity in an oblique direction with respect to an optical axis or satisfies a light distribution regulation, and a lighting device having the same. An embodiment of the invention may provide an optical member and a lighting device having the same, where a shape of light emitted from the same surface has different images depending on the direction in which it is viewed. An embodiment of the invention may provide a light unit, a display device, or a vehicle lamp having a lighting device.

Technical Solution

A lighting device according to embodiment of the invention comprises a substrate; a light source disposed on the substrate; a resin layer disposed on the substrate; and an optical member disposed on the resin layer, wherein the optical member includes a base layer, a pattern layer disposed on the base layer, and a reflective layer disposed on the pattern layer, and a pattern of the pattern layer includes a first surface and a second surface having a predetermined angle with respect to the first surface, the reflective layer is disposed on the first surface, and a difference between a intensity of light emitted to an outside through the first surface and the second surface may be 5 times or more.

According to an embodiment of the invention, the pattern layer includes a plurality of patterns arranged in a first direction, and the plurality of patterns may be prism patterns. The first surface and the second surface are connected to each other at one end, and a side cross section of the first surface and the second surface may form a triangular shape with the base layer. The optical member may be spaced apart from the resin layer. The patterns may have a long length in a second direction perpendicular to an emission direction of the light source. The reflective layer may not be disposed on the second surface.

A lighting device according to an embodiment of the invention includes a substrate; a light source disposed on the substrate; a resin layer disposed on the substrate; and an optical member disposed on the resin layer, wherein the optical member includes a base layer, a pattern layer disposed on the base layer, and a reflective layer disposed on the pattern layer, and the pattern layer includes a plurality of patterns having a first surface and a second surface extending from the first surface, wherein the reflective layer is disposed on the first surface, and the plurality of patterns may include a region in which angles between the first surface and the second surface are different.

According to an embodiment of the invention, the region may include a first region where the angle is a first angle, a second region where the angle is a second angle, and a third region where an angle is changed from the first angle to the second angle. The first region is a region with a highest luminous intensity of front light distribution, the second region is a region with a highest luminous intensity of side light distribution, and the third region is disposed between the first region and the second region, and may have a highest luminous intensity in a direction between the front and the side. The first angle may be larger than the second angle. The plurality of patterns may include regions where a length of a short axis of the first surface is different from that of a short axis of the second surface.

A lighting device according to an embodiment of the invention includes a substrate; a light source disposed on the substrate; a resin layer disposed on the substrate; and an optical member disposed on the resin layer, wherein the optical member includes a base layer, a pattern layer disposed on the base layer, and a reflective layer disposed on the pattern layer, and the pattern layer includes a plurality of patterns having a first surface and a second surface extending from the first surface, wherein the reflective layer is disposed on the first surface, and a shape of light emitted through the pattern layer may be different from a first shape viewed from a first direction and a second shape viewed from a second direction.

According to an embodiment of the invention, the first direction may be a direction perpendicular to a lower surface of the base layer, and the second direction may be a direction forming an angle of 45 degrees to one side based on the first direction. A luminous intensity of a third shape viewed from a third direction that is 45 degrees from the first direction may be different from the luminous intensity of the first shape. The first shape may have the same outer image of 80% or more as the third shape. The second direction may be a direction facing the reflective layer, and the third direction may be a direction facing the second surface. The second shape may include a line shape equal to a width of an exit side of the resin layer. The first shape may include a surface shape corresponding to an exit surface of the resin layer.

Advantageous Effects

According to an embodiment of the invention, an image of lighting may be changed according to an angle of view. In addition, it may satisfy light distribution regulations for lights arranged along the curved surface of the vehicle. According to an embodiment of the invention, light may be emitted in a specific direction when the light is turned on. Additionally, by allowing the metal to be visually recognized when it is not turned on, it is possible to improve the off-light image. In addition, different images may be provided when the light is turned on or off. The optical reliability of optical members and lighting devices according to embodiments of the invention is improved, and may be applied to light units, various display devices, or vehicle lamps having the same.

DESCRIPTION OF DRAWINGS

FIG. 1 is a side cross-sectional view showing a first example of a lighting device according to a first embodiment of the invention.

FIGS. 2 (A) to (C) are examples of top views of the optical member of the lighting device of FIG. 1 and side cross-sectional views in the short axis and long axis directions of the pattern layer.

FIGS. 3 (A) and (B) are modified examples of the lighting device of FIG. 2(A).

FIG. 4 is another example of the optical member of the lighting device of FIG. 1.

FIG. 5 is another example of the optical member of the lighting device of FIG. 1.

FIG. 6 (A) is a side cross-sectional view showing a second example of the lighting device according to the first embodiment of the invention, and (B) is an example of a side cross-sectional view of a pattern.

FIG. 7 is a side cross-sectional view showing a modified example of the lighting device according to the first embodiment of the invention.

FIG. 8 is a side cross-sectional view showing a modified example of the lighting device according to the first embodiment of the invention.

FIG. 9 is an example of a side cross-sectional view of a lighting device according to a second embodiment of the invention.

FIG. 10 is an example of a side cross-sectional view of a lighting device according to a third embodiment of the invention.

FIG. 11 is an example of a top view of a lighting module of the lighting device of FIG. 10.

FIG. 12 is another example of the lighting device of FIG. 10.

FIG. 13 is an example of a plan view of a lighting device according to the fourth embodiment of the invention.

FIG. 14 is an example of a side cross-sectional view of the lighting device of FIG. 13.

FIG. 15 is another example of the lighting device of FIG. 13.

FIG. 16*a* is an example of a curved lamp using a lighting device according to an embodiment of the invention.

FIG. 16*b* is a modified example of an optical member in a lighting device according to an embodiment of the invention.

FIG. 17 is an example of a side cross-sectional view of a lighting device according to a fifth embodiment of the invention.

FIG. 18 is an example of a side cross-sectional view of a lighting device according to a sixth embodiment of the invention.

FIG. 19 is a plan view of a vehicle to which a lamp having a lighting device according to an embodiment of the invention is applied.

FIG. 20 is a diagram showing a lamp having a lighting module or lighting device according to an embodiment of the invention.

FIG. 21 is a diagram showing the light distribution of the lighting device applied to FIG. 19 or FIG. 20.

FIG. 22 (A) to (C) are diagrams comparing the luminous intensity of a comparative example and the luminous intensity of the lighting devices of FIGS. 1 and 6 (A) according to an embodiment of the invention.

BEST MODE

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

First Embodiment

FIG. 1 is a side cross-sectional view showing a first example of a lighting device according to a first embodiment of the invention, FIG. 2(A)(B)(C) is examples of top views of the optical member of the lighting device of FIG. 1 and side cross-sectional views in the short axis and long axis directions of the pattern layer, FIG. 3(A)(B) is modified examples of the lighting device of FIG. 2(A), FIG. 4 is another example of the optical member of the lighting device of FIG. 1, FIG. 5 is another example of the optical member of the lighting device of FIG. 1, FIG. 6(A) is a side cross-sectional view showing a second example of the lighting device according to the first embodiment of the invention, and (B) is an example of a side cross-sectional view of a pattern, FIG. 7 is a side cross-sectional view showing a modified example of the lighting device according to the first embodiment of the invention, and FIG. 8 is a side cross-sectional view showing a modified example of the lighting device according to the first embodiment of the invention.

Referring to FIGS. 1 to 8, the lighting device 400 may include a lighting module 10 and an optical member 20 on the lighting module 10. The lighting module 10 may emit a point light source, a line light source, or a surface light source. The point light source may emit light emitted from a light source or light emitting device having an OLED or LED in the form of a point. The line light source may emit light from a light source or light emitting device having a plurality of OLEDs or a plurality of LEDs in a line shape toward one side. The surface light source may emit light in the form of surface light of a predetermined area. The line light source has a line length that is 5 times, 10 times, or 20 times longer than the width, and the line width may be 5 mm or less or 3 mm or less. The light emitting area of the surface light source may be at least N mm x M mm on each side. The N and M may be the same or different from each other and may be 7 mm or more, and the number of internal light sources may be at least one in the breadthwise and longitudinal directions.

The light emission surface of the lighting module 10 may be flat or have a convex-convex shape. The light emitting surface of the lighting module 10 may be made of transparent resin or plastic. The lighting module 10 may be one or more layers, or two or more layers. A first layer may be a layer made of resin. A second layer may be two to five layers, and may include at least two or all of a substrate material layer, a reflective material layer, and a resin material layer. The at least two layers may be two to five layers, and may include at least two or all of a base layer, a reflection layer, or a diffusion layer. The lighting module 10 may emit light through at least one or both of the top, side, and bottom surfaces. The lighting module 10 may emit light incident through a surface facing the optical member 20 through an exit side. That is, the optical member 20 emits light through the emission side, which is opposite to the incident side. That is, the optical member 20 reflects light to each side of each pattern of the emission side pattern layer 22 and emits light through each other side.

The optical member 20 may include a pattern layer 22 having a plurality of patterns and a reflective layer 30 disposed on one side of each pattern of the pattern layer 22. Each pattern of the pattern layer 22 includes at least two sides, and may include, for example, a first surface S1 and a second surface S2 opposite the first surface S1. The first surface S1 and the second surface S2 may face each other or may be arranged at an angle with respect to a vertex or peak. The reflective layer 30 may be part of the optical member 20 or may be a separate component.

As an example, the optical member 20 may reflect incident light onto the inclined first surface S1 and transmit it through the inclined second surface S2. As an example, the optical member 20 may reflect incident light with the reflective layer 30 disposed on the plurality of first surfaces S1 and transmit it through the plurality of second surfaces S2. As an example, the optical member 20 may form a plurality of patterns, and at least one of the surfaces S1 and S2 facing each other may have a reflectance higher than the transmittance, and at least another one may have a transmittance higher than the reflectance.

As an example, the optical member 20 may improve light distribution in a specific direction (e.g., the front or one direction) through reflection and transmission of each of the plurality of patterns. The optical member 20 is an example, and since each of the plurality of patterns has a transmissive surface with the reflective layer 30, different images may be provided according to lighting or not lighting. As an example, the optical member 20 may emit light through the second surface S2 through which each of the plurality of patterns passes, thereby providing a light distribution having the highest luminous intensity in a specific direction or providing a light distribution that satisfies the light distribution regulation of the mobile device. As an example, the optical member 20 may reflect and transmit incident light through each pattern having a first surface S1 on which the reflective layer 30 is formed and a second surface S2 on which the reflective layer 30 is not formed.

The optical member 20 may include a base layer 21 under the pattern layer 22, and a plurality of patterns may be arranged on the base layer 21. The optical member 20 may include a transparent material or a diffusion material, for example, at least one of polyester (PET) film, poly methyl methacrylate (PMMA) material, or poly carbonate (PC). The optical member 20 may be formed integrally with a base layer 21 and a pattern layer 22 having a plurality of patterns. The base layer 21 is a material that transmits light and may be the same material as the pattern layer 22. The optical member 20 may be spaced apart from the emitting surface or upper surface of the lighting module 10, or may be attached to the upper or emitting surface of the lighting module 10. As another example, the pattern layer 22 may be a different material from the base layer 21 or a transparent material attached separately, and the pattern layer 22 may be attached to the base layer 21 with a separate adhesive. At this time, the pattern layer 22 may be provided as single patterns or in a form where all patterns are connected.

The optical member 20 receives light through a lower surface or a surface facing the lighting module 10, and the incident light proceeds through the base layer 21, be reflected from one side of each pattern of the pattern layer 22, and be extracted through the other side. Each of the patterns may include a prism pattern shape or a convex lens shape. Each of the patterns may have a polygonal side cross-section, a hemispherical or semi-elliptical shape, or a shape having a curvature. The polygonal shape may include a triangular, square, or pentagonal shape.

As shown in FIG. 2(A), each pattern of the pattern layer 22 has a long length in a longitudinal direction orthogonal to the arranged breadthwise direction, and may have, for example, a length equal to the length of the optical member 20 in the breadthwise direction, and may be continuously or discontinuously arranged along the breadthwise direction. Each pattern of the adjacent pattern layer 22 may be disposed parallel to each other. Each pattern of the pattern layer 22 may be periodically arranged. The plurality of reflective layers 30 may be periodically arranged. The length in the longitudinal direction may be a length in a long axis direction of each pattern, and the longitudinal direction may be a bottom length of each pattern.

As another example, a plurality of separate patterns of the pattern layer 22 may be arranged in the vertical direction of the optical member 20 and may be periodically arranged along the longitudinal direction. That is, the length of each pattern of the pattern layer 22 may be smaller than the length of the base layer 21 of the optical member 20.

As shown in FIG. 2(B), the base layer 21 of the optical member 20 may have a thickness T1 greater than the height C2 of each pattern of the pattern layer 22. The thickness T1 of the base layer 21 may be 2.3 mm or less, for example, 2 mm or less, or may be in the range of 1.8 mm to 2 mm. When the base layer 21 is formed integrally with each pattern of the base layer 21 and the pattern layer 22, the thickness T1 of the base layer 21 may support each pattern of the pattern layer 22 and the optical member 20 may be provided in the above range to prevent a decrease in rigidity.

The height C2 of each pattern of the pattern layer 22 may be 0.8 times or less or 0.9 times less than the thickness T1 of the base layer 21, for example, in a range of 0.3 mm or less, 0.05 mm to 0.2 mm, or 0.08 mm to 0.15 mm. When each pattern of the pattern layer 22 is within the above range, it is easy to process and may emit incident light. Each pattern of the pattern layer 22 may include a first surface S1 and a second surface S2 opposing the first surface S1. The first surface S1 and the second surface S2 may be inclined toward an upper vertex. The first surface S1 may be defined as a first inclined surface, and the second surface S2 may be defined as a second inclined surface.

The lengths of the first surface S1 and the second surface S2 may be the same, or the length of the first surface S1 may be greater than the length of the second surface S2. The plurality of patterns may include regions where the length of the short axis of the first surface S1 and the length of the short axis of the second surface S2 are the same. As another example, the plurality of patterns may include regions where the length of the short axis of the first surface S1 is different from the length of the short axis of the second surface S2. At this time, the short axis length is the length from an upper end to a lower end of each side formed by each surface S1 and S2. The short axis length of the first and second surfaces S1 and S2 is the distance from the vertex to the lower end. The inclination angle R1 of the first surface S1 is equal to the inclination angle of the second surface S2 with respect to the horizontal line L1 passing through a bottom, or the inclination angle of the first surface S1 may be greater than the inclination angle of the second surface S2. The inclination angle R1 of the first surface S1 may be 60 degrees or less, for example, in the range of 30 to 60 degrees. Accordingly, when viewed from the outside, exposure of the second surface S2 may have minimized or not exposure. The first and second surfaces S1 and S2 may extend from one end in different directions or obliquely toward the lighting module 10. The angle R0 formed by the first and second surfaces S1 and S2 is an interior angle and may be 90 degrees or less, for example, in the range of 30 to 90 degrees, or may be equal to 30 degrees, 60 degrees, or 90 degrees.

The bottom length C1 of each pattern of the pattern layer 22 may be greater than the height C2. For example, the bottom length C1 may be 1.5 times or more or in the range of 1.5 to 2.2 times the height C2. The height C2 of each pattern of the pattern layer 22 may be 0.1 times or less or in the range of 0.03 to 0.1 times the thickness (e.g., T1+C2) of the optical member 20. Since the bottom length C1 of each pattern of the pattern layer 22 is arranged to be greater than the height C2, the amount of incident light through the bottom may be increased, the extraction direction of light through each pattern of the pattern layer 22 may be adjusted. The upper end of the reflective layer 30 may be positioned higher than the upper end of each pattern of the pattern layer 22. Accordingly, when viewed from the outside, an exposed area of the second surface S2 may be reduced.

The optical member 20 may have a first surface S1 and a second surface S2 alternately arranged at the upper portion. The optical member 20 may have an inclined first surface S1 and an inclined second surface S2 arranged alternately at the upper portion. The optical member 20 may have reflective layers 30 and second surfaces S2 alternately arranged on the upper portion. The bottom of the concave portion 24 between the first and second surfaces S1 and S2 may be a boundary surface between the first and second surfaces S1 and S2, or may be a flat bottom. The flat bottom width may be 0.8 times smaller than the bottom width C1 of each pattern of the pattern layer 22.

The concave portions 24 may be disposed between each pattern of the pattern layer 22. Each of the concave portions 24 may be respectively disposed between the first surface S1 and the second surface S2, or between the reflective layer 30 and the second surface S2. Here, as shown in FIG. 2(C), when the pattern layer 22 of the optical member 20 is viewed from the second surface S2 toward the first surface S1, most of the second surface S2 may be exposed, and the second surface S2 and the upper end of the reflective layer 30 may be exposed. As another example, when the upper end of the reflective layer 30 is equal to or lower than the upper end of the second surface S2, it may not be exposed when viewed from the second surface S2. Here, when the pattern layer 22 of the optical member 20 is viewed from the first surface S1 toward the second surface S2, the first surface S1 is not exposed and the reflective layer 30 is may be exposed.

The reflective layer 30 may be disposed on one of the first surface S1 and the second surface S2 located on one side and the other with respect to the center of each pattern of each pattern layer 22. For example, the reflective layer 30 may be disposed on the first surface S1. The plurality of reflective layers 30 may be disposed on each of the plurality of first surfaces S1. The first surface S1 and the second surface S2 are connected to each other at one end, and may be gradually spaced apart toward the lighting module 10, and may form a triangular shape with the base layer 21. The second surface S2 may extend from the first surface S1. Conversely, the first surface S1 may extend from the second surface S2. The first surface S1 on which the reflective layer 30 is disposed may be defined as a reflective surface on the optical member 20, and the second surface S2 may be defined as a transparent surface. As another example, when the optical member 20 is provided as a curved surface with respect to the breadthwise direction, that is, the pattern arrangement direction of the pattern layer 22, the shapes of the patterns of the pattern layer 22 disposed on one side and the other side of the curved surface may be different from each other. Alternatively, the areas of the first and second surfaces S1 and S2 of each pattern of the pattern layer 22 disposed on one side and the other side of the curved surface may be different from each other. As another example, the plurality of reflective layers 30 may be disposed on different surfaces depending on the region of each pattern of the pattern layer 22. For example, the optical member 20 may be positioned in the breadthwise direction, that is, along the pattern layer 22. When provided as a curved surface with respect to the pattern arrangement direction, the reflective layer 30 may be disposed on the first surfaces S1 at one side of the curved surface, and the reflective layer 30 may be disposed on the second surfaces S2 at the other side of the curved surface.

The reflective layer 30 may include at least one or an alloy of two or more of Al, Ag, Cu, Au, Pt, and Ni. The reflective layer 30 may be formed of a metal material with high reflectivity. The reflective layer 30 may be formed of a highly reflective non-metallic material or a resin material, and may contain at least one of $TiO_2$, $SiO_2$, and $Al_2O_3$ therein. The reflective layer 30 may be deposited using stuttering equipment. The reflective layer 30 may be a single layer or a multi-layer, and in the case of a multi-layer, layers of different materials may be stacked.

The thickness of the reflective layer 30 may be smaller than the height C2 of each pattern of the pattern layer 22, and may be 0.7 times or less or in the range of 0.3 to 0.7 times the height C2. The thickness of the reflective layer 30 may be 0.07 mm or less, for example, in the range of 0.03 mm to 0.07 mm. When the thickness of the reflective layer 30 is less than the above range, the reflectance may decrease, and when it is greater than the above range, the improvement in reflectance may be minimal and may affect the transmission region of the second surface S2.

The areas of the first surface S1 and the second surface S2 of each pattern of the pattern layer 22 are the same, or the area of the first surface S1 may be greater than the area of the second surface S2. Here, the outer area of the reflective layer 30 may be equal to or larger than the area of the first surface S1. The lower end of the reflective layer 30 may be in contact with the interface between the first and second surfaces S1 and S2, or may be in contact with the lower portion of the second surface 30. This lighting device 400 may emit higher front light distribution than from side light distribution. In addition, different exterior images may be provided when turned on or off, light from the lighting module 10 may be emitted when turned on, and the metal reflective surface may be exposed when not turned on.

As shown in FIG. 3(A), each pattern of the pattern layer 22 disposed on the optical member 20 may be disposed in a diagonal shape and may be parallel to each other. The plurality of reflective layers 30 may be parallel to each other and may be arranged in an inclined or diagonal shape with respect to the breadthwise direction. The direction in which light is extracted may be adjusted depending on the direction in which each pattern of the pattern layer 22 is formed. As shown in FIG. 3(B), each pattern of the pattern layer 22 disposed on the optical member 20 may be arranged in a curved shape or an arc shape and may be spaced apart from each other at equal intervals. The plurality of reflective layers 30 may be arranged in a curved shape or arranged in an arc shape with a curvature in the horizontal direction. The direction in which light is emitted may be adjusted depending on the direction in which each pattern of the pattern layer 22 is formed.

In an embodiment of the invention, the reflective layer 30 may completely or partially reflect light, but in the case of partial reflection, the transmitted light may be minimal. For example, the light transmitted without being reflected through the reflective layer 30 may be transmitted at a luminous intensity or quantity less than ⅕ of the light transmitted through the second surface S2 without a reflective layer. That is, the light transmitted through the second surface S2 of each pattern may have a luminous intensity or amount of light that is more than 5 times higher than the light leaked through the reflective layer 30. That is, the luminous intensity extracted to the outside through the first surface S1 on which the reflective layer 30 is disposed and the second surface S2 may differ by more than 5 times. In an embodiment of the invention, the reflective layer 30 may be formed in 50% or in the range of 30% to 50% of each pattern of the pattern layer 22. Accordingly, more than 50% of the light incident through the optical member 20 may be transmitted through the surface without the reflective layer 30.

When the optical member 20 is viewed 45 degrees to the left and 45 degrees to the right based on a straight line perpendicular to the lower surface, the luminous image or luminous intensity when turned on may be different. That is, the luminous intensity of the direction in which light is reflected by the reflective layer and the direction in which the light is transmitted may be different. When the optical member 20 is viewed 45 degrees to the left and 45 degrees to the right based on a straight line perpendicular to the lower surface, the external image of the optical member 20 when not illuminated may be different. In other words, the image of the surface with the reflective layer may be different from the image of the surface without the reflective layer. When the optical member 20 is viewed 45 degrees to the left and 45 degrees to the right based on a straight line perpendicular to the lower surface, a direction in which light is reflected by the reflective layer and a direction in which light is transmitted may be different from each other in the surface light image at the time of lighting.

As shown in FIG. 4, a size of each pattern of the pattern layer 22 disposed on the optical member 20 may gradually increase or decrease in one direction. Each pattern of the pattern layer 22 may be arranged in different sizes and, for example, may become smaller as it moves from one side of the optical member 20 to the other side. The height of each pattern of the pattern layer 22 or the areas of the first surfaces S1 may be different from each other, and for example, may become smaller from one side of the optical member 20 to the other side. The area of the second surface S2 of each pattern of the pattern layer 22 may be different from each other, and for example, may become smaller from one side of the optical member 20 to the other side. Accordingly, the optical member 20 may have different optical characteristics depending on the arrangement direction of each pattern, the arrangement shape of each pattern, and the position of the reflective layer 30 at the upper portion of the optical member 20.

As another example, as shown in FIG. 16b, the optical member 20C may include a region in which the size of each pattern of the pattern layer 22F are different, that is, at least two or three regions. That is, each pattern may include a first region A1 having a first size, a second region A2 having a second size, and a third region A3 having a third size between the first and second sizes. Each of the first, second, and third regions A1, A2, and A3 may include at least two or three identical patterns. Each pattern size of the first, second, and third regions A1, A2, and A3 may have different heights, different lengths of the first surface S11 of each pattern, or different lengths of the bottom lengths of each pattern.

As another example, as shown in FIG. 16b, the optical member 20C may include a region in which angles R5, R6, and R7 formed by the first and second surfaces S11 and S12 of each pattern of the pattern layer 22F are different, that is, at least two or three regions. That is, the first region A1 whose interior angle is the first angle R5, the second region A2 whose interior angle is the second angle R6, and the third region A3 whose interior angle is a third angle R7 between the first and second angles R5 and R6. Each of the first, second, and third regions A1, A2, and A3 may include at least two or three identical patterns. Referring to the arrangement direction, the first, third, and second regions A1, A3, and A2 are arranged in that order from one side of the optical member to the other side, but the first, second, and third regions A1, A2, and A3 are arranged in that order, or may be arranged in order of the second, first, and third regions A2, A1, and A3.

As shown in FIG. 16b, among each pattern of the pattern layer 22F, the patterns of the first group (Region A2) adjacent to the other side of the optical member 20C may have a first size or first height, and the patterns of the second group (Region A1) adjacent to one side may be arranged in a second size that is greater than the first size or a second height that is larger than the first height. Accordingly, the upper portion of the optical member 20C may have different optical characteristics depending on the groups or regions. At this time, the reflective layer 30 may be disposed on one side of each pattern, and the other side may not have a reflective layer.

Additionally, a lower surface S20 of the optical member 20C may include a horizontal plane, a concave surface, or a convex surface. Additionally, the optical member 20C may be made of a soft material. Additionally, the thickness of the base layer 21 of the optical member 20C may be thicker on one side than on the other side.

The first and second surfaces S1 and S2 may extend from one end in different directions or obliquely toward the lighting module 10. The angle R0 formed by the first and second surfaces S1 and S2 is an internal angle of 90 degrees and may be equal to each other. As another example, as shown in FIG. 2(B) and FIG. 6(B), the plurality of patterns may include the regions in which an angle R0 formed by the first surfaces S1 and S6 and the second surfaces S2 and S7 are different, and for example, may include a first region formed of a plurality of first patterns each having a first angle selected from 30 degrees to 45 degrees, a second region formed of a plurality of second patterns having a second angle having an inner angle of 60 degrees, and a third region formed of a plurality of third patterns having a third angle having an inner angle of 90 degrees. Referring to the arrangement direction, the optical member may be arranged in the order of first, second, and third regions, or first, third, and second areas, or third, second, and first regions from one side to the other side of the optical member.

Referring to FIG. 5, the optical member 20 includes a concave portion 24 between a plurality of patterns, and a bottom of the concave portion 24 may have a flat bottom. That is, the patterns may be discontinuously disposed by the bottom of the concave portion 24. The optical member 20 may be repeated in the order of the first surface S1, the second surface S2, and the concave portion 24. Alternatively, the optical member 20 may be repeated in the order of the reflective layer 30, the second surface S2, and the concave portion 24. Since the bottom of the concave portion 24 is provided flat, the amount of light extracted to the upper portion (vertically upward direction) of the optical member 20 may be increased. Here, the bottom of the concave portion 24 may be in contact with the bottom of the reflective layer 30. The upper end of the reflective layer 30 may be positioned higher than the upper end of each pattern of the pattern layer 22. Accordingly, when viewed from the outside, the exposed area of the second surface S2 may be reduced.

When the lighting module 10 is driven or turned on, the light extracted through the optical member 20 travels in a specific direction, thereby improving the light distribution in the front direction. The surface of the reflective layer 30 may be visible. Accordingly, it is possible to improve the image caused by the material of the reflective layer when not turned on.

The lighting device 400 according to an embodiment of the invention may surround a region other than the lighting region with a bracket. The bracket may be placed around a lower portion, side walls, and upper portion of the lighting device 400. The lighting device 400 may emit light emitted from the lighting module 10 toward a specific direction. The lighting device 400 may be applied to various lamp devices that require lighting, such as vehicle lamps, household lighting devices, and industrial lighting devices. For example, in the case of lighting modules applied to vehicle lamps, head lamps, side lights, side mirror lights, fog lights, tail lamps, turn signal lamps, back up lamps, stop lamps, daytime running lights, vehicle interior lighting, door scarf, rear combination lamp, and backup lamp, etc.

FIG. 6(A)(B) is a second example of a lighting device according to the first embodiment of the invention, and the lighting device may include an optical member 20 having a pattern layer 22A and a reflective layer 30 on a lighting module 10. The pattern layer 22A has a plurality of patterns, and each pattern includes two surfaces S6 and S7 that face or are adjacent to each other, and the reflective layer 30 may be disposed on one of the surfaces S6 and S7 that face or are adjacent to each other. The reflective layer 30 is disposed on the first surface S6 of each pattern and reflects light incident on the first surface S6. The second surface S7 of each pattern faces the first surface S6, and light reflected from the first surface S6 and directly incident light may be emitted. The lighting module 10 may include a configuration described above or described below. The first surface S6 may be provided as an inclined surface, and the second surface S7 may be provided as a vertical surface. The inclination angle R2 of the first surface S6 may be smaller than the angle of the second surface S7. The angle of the second surface S7 may be 90 degrees. That is, each of the patterns may have a side cross section shaped like a right triangle. The area of the first surface S6 may be larger than the area of the second surface S7. The inclination angle R2 of the first surface S6 may be 60 degrees or less or in the range of 30 to 60 degrees. The height of each pattern may be equal to the bottom length of each pattern, or may be smaller than the length of the inclined surface of the first surface S1. The reflective layer 30 may be disposed on each first surface S6 of each pattern. The reflective layer 30 may contact the bottom of the second surface S7 or the boundary between the first and second surfaces S6 and S7. The boundary portion may be the bottom of the concave portion 24.

As shown in FIG. 6(B), the bottom length C3 and the height C2 of each pattern may be the same, for example, the bottom length C3 may be 0.3 mm or less, in a range of 0.05 mm to 0.3 mm, or in a range of 0.08 mm to 0.15 mm. The upper end of the reflective layer 30 may be positioned higher than the upper end of each pattern of the pattern layer 22A. Accordingly, when viewed from the outside, the exposed area of the second surface S7 may be reduced. This lighting device may emit higher side light distribution than front light distribution. Additionally, different exterior images may be provided when turn on or not turn on. When not turned on, the metal reflective surface may be exposed. The pattern layer 22A may be formed integrally with the base layer 21, or may be formed separately from the base layer 21 and then attached to the base layer 21. The short axis length of the first surface S6 and the second surface S7 may be different from each other. For example, the short axis length of the first surface S6 may be greater than the short axis length of the second surface S7. The plurality of patterns may include regions where the short axis length of the first surface S6 and the short axis length of the second surface S7 are different. At this time, the short axis length is the length from the upper end to the lower end of each side formed by each surface S6 and S7.

The optical member 20 may include a region including the pattern layer 22 of FIGS. 1 and 4 among the pattern layers of FIGS. 1, 4, and 6, the pattern layers 22 and 22A of FIGS. 1 and 6, the pattern layers 22 and 22A of FIGS. 4 and 6, or the pattern layers 22 and 22A of FIGS. 1, 4, and 6. As an example, the plurality of patterns may include a region where the angle formed by the first surface S1 and the second surface S2 is different. The region may include a first region where the angle is a first angle, a second region where the angle is a second angle, and a third region where the angle changes from the first angle to the second angle. The first region is a region where the luminous intensity of the front light distribution is the highest, the second region is a region where the luminous intensity of the side light distribution is the highest, and the third region may be a region where the luminous intensity of the light distribution in the middle part between the front and the side is the highest. The first angle may be larger than the second angle. Additionally, the plurality of patterns may include regions where the length of the short axis of the first surface is different from that of the short axis of the second surface.

As shown in FIG. 7, each pattern of the pattern layer 22B of the optical member 20 may have a polygonal shape, for example, a shape where the upper width is narrower than the lower width (e.g., trapezoidal shape). The reflective layer 30 may be disposed on the first surface S3, which is one of the three sides of each pattern of the pattern layer 22B. The upper surface S5 of each pattern of the pattern layer 22B may be flat and may be spaced apart from or exposed to the reflective layer 30. In each pattern of the pattern layer 22B, the second surface S4 of the upper surface S5 is exposed and light may be extracted. Each pattern of the pattern layer 22B may be formed continuously or discontinuously on the base layer 21. The concave portions 24 disposed between each pattern of the pattern layer 22B may have an inverted triangle shape or a flat bottom.

As shown in FIG. 8, the lighting device may include an optical member 20 having a lighting module 10, a pattern layer 22C, and a reflective layer 30. Each pattern of the pattern layer 22C of the optical member 20 may have a hemispherical shape, for example, a shape having a convex curved surface (for example, a convex lens shape). The pattern layer 22C may be divided into one side and the other side based on the surface center or vertex of each pattern, or may be divided into a first surface on one side and a second surface on the other side based on the center or vertex.

The reflective layer 30 may be disposed on one curved surface of each pattern of the pattern layer 22C of the optical member 20, that is, on the first surface. The pattern layer 22C may emit light through the other curved surface of each pattern, that is, the second surface. The pattern layer 22C may be formed continuously or discontinuously on the base layer 21. Concave portions 24 may be disposed between each pattern of the pattern layer 22C.

Comparing the luminous intensity by the lighting device of the structure of the embodiment of the invention and the comparative example (structure without a pattern) is as follows.

FIG. 22(A)(B)(C) is diagram comparing the luminous intensity of comparative Example, Example 1 having the structure of FIG. 1 and Example 2 having the structure of FIG. 6. The comparative Example has a structure in which the optical member does not have a prism pattern. In the comparative Example(A), it may be seen that the front light distribution in the horizontal and vertical directions (H, V) is about 20.7 cd, and the side light distribution is 4.2 cd at around 75 degrees. Example 1 of the inventive shows that the front light distribution in the horizontal and vertical directions (H, V) is about 26.6 cd, which is higher than the comparative Example, and the side light distribution is 0.4 cd around 75 degrees, which is lower than the comparative Example. That is, in Example 1, since the front light distribution emits higher light than the side light distribution, it may be provided as a lighting device for front light distribution. Example 2 of the invention shows that the front light distribution in the horizontal and vertical directions (H, V) is about 16.2 cd, which is lower than the comparative Example, and the side light distribution is 4.8 cd at around 75 degrees, which is higher than the comparative example. That is, Example 2 may be used as a lighting device for side light distribution because the side light distribution emits higher light than the front light distribution.

Examples of light distributions at 45 degrees left, 45 degrees front, and 45 degrees right when the comparative Example and Examples 1 and 2 of the present invention are not turned on and off are as follows. Here, an example in which red light is emitted from the lighting module 10 will be described.

In the comparative Example, red light is emitted in a uniform distribution at 45 degrees left, 45 degrees front, and 45 degrees right when the lighting is turned on, and left/right drawings may show the same at 45 degrees left, 45 degrees front, and 45 degrees right when the lighting is turned on. On the other hand, in Examples 1 and 2 of the invention, when the lighting is turned on, light distributions show at 45 degrees to the front and right, and at 45 degrees to the left, light distribution does not appear due to the reflective layer, and prism-shaped patterns at the left 45 degrees are not exposed when the lighting is not turned on and images (metal-feeling images) may be improved by the reflective layer. Accordingly, the reflective layer may be formed on the first surface of the prism pattern of the optical member, the light intensity distribution may vary according to the inclination angle of the first surface, and the reflective layer may improve the appearance image when the lighting is not turned on.

Referring to the Invention Examples 1 and 2, when the lighting is turned on, the ambient leakage light of the optical member at 45 degrees to the left may be some light exposed through the side wall of the lighting module or reflected through the bracket.

Second Embodiment

The description of the second embodiment may include the description of the first embodiment for the same components as the description of the first embodiment, and duplicate descriptions will be omitted. The second embodiment may optionally include the configuration of the first embodiment disclosed above.

Referring to FIG. 9, the lighting device 400 according to an embodiment of the invention may include a lighting module 10, an optical member 20 having a pattern layer 22 and a reflective layer 30 on the lighting module 10. The reflective layer 30 may be a part of the optical member 20 or may be defined as a separate component. The optical member 20 may be selected from the optical members disclosed above. An example of the lighting module 10 may include a substrate 11, a light source 13 disposed on the substrate 11, and a resin layer 17 sealing the light source 13 on the substrate 11. The lighting module 10 may include a reflective member 15 disposed on the upper surface of the substrate 11. The reflective member 15 may be disposed between the substrate 11 and the resin layer 17 and may reflect incident light. A diffusion layer (430 in FIG. 10) may be included between the lighting module 10 and the optical member 20.

The lighting module 10 may emit light emitted from the light source 13 as surface light. The light sources 13 may be arranged in plurality on the substrate 11, and the light sources 13 may be arranged in one or more rows and one or more columns. The light sources 13 may be arranged in n rows and m columns (n, m=2 or more). The substrate 11 may function as a base member or support member disposed under the light source 13 and the resin layer 17. The substrate 11 includes a printed circuit board (PCB). The board 11 may include, for example, at least one of a resin-based PCB, a metal core PCB, a flexible PCB, a ceramic PCB, or an FR-4 board. The substrate 11 may include, for example, a flexible PCB or a rigid PCB. The upper surface of the substrate 11 has an X-axis-Y-axis plane, and the thickness of the substrate 11 may be the height in the Z direction. Here, the X and Y directions may be perpendicular to the Z direction.

The substrate 11 includes a wiring layer (not shown) on the upper portion thereof, and the wiring layer may be electrically connected to the light sources 13. The light sources 13 may be connected in series, parallel, or series-parallel by the wiring layer of the substrate 11. The light sources 13 may be connected in series or parallel in groups of two or more, or the groups may be connected in series or parallel. The thickness of the substrate 11 may be 0.5 mm or less, for example, in the range of 0.3 mm to 0.5 mm. Since the substrate 11 is provided with a thin thickness, the flexible module may be supported without increasing the thickness of the lighting module.

The substrate 11 may have a top view shape of a rectangle, a square, or another polygonal shape, or may have a curved bar shape. The substrate 11 may include a protective layer or a reflective layer on the upper portion. The protective layer or reflective layer may include a member made of a solder resist material, and the solder resist material is a white material and may reflect incident light. As another example, the substrate 11 may include a transparent material. Since the substrate 11 is made of a transparent material, light emitted from the light source 13 may be emitted in the upper and lower directions of the substrate 11.

The light source 13 may be disposed on the substrate 11 and sealed by the resin layer 17. The plurality of light sources 13 may be in contact with the resin layer 17. The resin layer 17 may be disposed on the side surfaces and upper surface of the light source 13. The resin layer 17 seals the light sources 13 and may be in contact with the upper surface of the substrate 11 and/or the reflective member 15.

Light emitted from the light source 13 may be emitted through the resin layer 17. The light source 13 may emit light through at least five side surfaces. That is, the light source 13 is an LED chip that emits light from five side surfaces, and may be disposed on the substrate 11 in the form of a flip chip. As another example, the light source 13 may be implemented as a horizontal chip or a vertical chip. The distance between the light sources 13 may be equal to or greater than the thickness of the resin layer 17. The distance may be, for example, 2.5 mm or more and may vary depending on the LED chip size. Since the light source 13 is provided as a flip chip that emits light from at least five side surfaces, the luminance distribution and beam angle distribution of the light source 13 may be improved and dark regions may be prevented. Additionally, the beam angle distribution of the light source 13 may be 130 degrees or more.

The light source 13 is a light emitting diode (LED) chip and may emit at least one of blue, red, green, ultraviolet (UV), or infrared light. The light source 13 may emit, for example, at least one of blue, red, and green. The light source 13 may be sealed on the surface with a transparent insulating layer or resin, but is not limited thereto. The light source 13 may have a phosphor layer having phosphors formed on its surface. The light source 13 may have a ceramic support member or a support member including a metal plate disposed under the LED chip, and the support member may be used as an electrically conductive and thermally conductive member.

The resin layer 17 is disposed on the substrate 11 and seals the light source 13. The resin layer 17 may be made of a transparent resin material, such as UV resin, silicone, epoxy, or PET (Polyethylene terephthalate). The resin layer 17 may be a transparent material layer to which no impurities are added. Since the resin layer 17 is free of impurities, light may pass through the resin layer 17 in a straight line. As another example, the resin layer 17 may include a diffusion agent therein.

The resin layer 17 may be thicker than the thickness of the light source 13. The thickness of the resin layer 17 may be thicker than the thickness of the substrate 11. The thickness of the resin layer 17 may be at least 5 times thicker than the thickness of the substrate 11, for example, in the range of 5 to 9 times. By being disposed with the above thickness, the resin layer 17 may seal the light source 13 on the substrate 11, prevent moisture from penetrating, and support the substrate 11. The resin layer 17 and the substrate 11 may be made of flexible plates. The thickness of the resin layer 17 may be 2.7 mm or less, for example, in the range of 2 mm to 2.7 mm. When the thickness of the resin layer 17 is less than the above range, the diffusion distance of light may increase, and when it is greater than the above range, the module thickness may increase or the luminous intensity may decrease.

The optical member 20 emits light incident through the resin layer 17 through the second surface S2, and at this time, light incident on the first surface S1 may be reflected toward the second surface S2 by the reflective layer 30. Accordingly, the optical member 20 may emit incident light in a specific direction, that is, light with a higher frontal or/and side light distribution. At least one of each pattern of the pattern layer 22 of the optical member 20 may overlap the light source 13 in a vertical direction. As another example, at least one or all of the light sources 13 may overlap each pattern of the pattern layer 22 or the reflective layer 30 in the vertical direction. Accordingly, hot spots on the optical member 20 may be reduced.

Referring to FIG. 9, a shape of the light emitted through the pattern layer 22 of the optical member 20 may be different from a first shape viewed in the first direction Z and a second shape viewed in the second direction Z1. The first direction Z may be a direction perpendicular to the horizontal straight direction X of the base layer 21, and the second direction Z1 may be a direction forming 45 degrees on one side relative to the first direction Z. The luminous intensity of the third shape viewed from the third direction Z2, which is 45 degrees to the other side with respect to the first direction Z, may be different from the luminous intensity of the first shape. That is, the first shape and the third shape may have an appearance image that is more than 80% the same. The second direction Z1 may be a direction facing the reflective layer 30, and the third direction Z2 may be a direction facing the second surface S2. The second shape may have a line width corresponding to the edge of the resin layer 17 (height of face S11 in FIG. 14) or provide surface lighting that is larger than the line width. The first shape may be a surface shape corresponding to the upper surface or exit surface of the resin layer 17.

Third Embodiment

The description of the third embodiment may include the description of the first embodiment for the same components as the description of the first embodiment, and duplicate descriptions will be omitted. The third embodiment may optionally include the configurations of the first and second embodiments disclosed above.

Referring to FIGS. 10 to 12, the lighting device 400 according to an embodiment of the invention may include a light source 100, a resin layer 420 made of a resin material, a diffusion member 430, and the optical member 20 disclosed above. The optical member 20 may be selectively included among the configurations of FIGS. 1 to 8. The lighting device 400 may include the light source 100 and a substrate 401 disposed below the resin layer 420. The lighting device 400 may include at least one diffusion member 430 and at least one of a light blocking portion 425 and/or a light transmitting layer 415 on the resin layer 420. The lighting device 400 may include a reflective member 410 disposed between the substrate 401 and the resin layer 420 and having a side surface 417. The lighting device 400 according to an embodiment of the invention may emit light emitted from the light source 100 as a surface light source. Here, the substrate 401, the reflective member 410, the light source 100, and the resin layer 420 may be defined as the lighting module 10 disclosed in the embodiment. The lighting module 10 may further include a light blocking portion 425, a light transmitting layer 415, and a diffusion member 430. The resin layer 420 may include optical resin disposed around the light source 100. The optical resin may be a curable transparent resin that is cured by at least one of ultraviolet rays or infrared rays.

The light source 100 is disposed on the substrate 401 and emits light toward the emission surface. The light source 100 emits light with the highest intensity in one direction. The light source 100 may have an emission surface 81 through which light is emitted, and the emission surface 81 may be disposed in, for example, a different direction or perpendicular to the horizontal upper surface of the substrate 401. The emission surface 81 may be a vertical plane or may include a concave surface or a convex surface. For example, the light source 100 may be disposed on the substrate 401 and electrically connected to the pad of the substrate 401 by a conductive bonding member 403. The conductive bonding member 403 may be made of solder or metal.

The light source 100 may be a device having a light-emitting chip within its body or may include a package in which a light-emitting chip is packaged. The emission surface 81 of the light source 100 may be in contact with the resin layer 420 or may emit light in the X direction. The light emitting chip may emit at least one of blue, red, green, ultraviolet (UV), and infrared rays, and the light source 100 may emit at least one of white, blue, red, green, and infrared rays. The light source 100 may be of a side view type whose bottom portion is electrically connected to the substrate 401, but is not limited thereto. As another example, the light source 100 may be an LED chip or a top-view package. The reflective member 410 may include a metallic material or a non-metallic material. The metallic material may include metals such as aluminum, silver, and gold. The non-metallic material may include a plastic material or a resin material.

The thickness of the resin layer 420 may be 3 mm or less, for example, in the range of 1.8 mm to 3 mm. When the thickness of the resin layer 420 is thicker than the above range, the luminous intensity may decrease and there may be difficulty in providing a flexible module due to an increase in module thickness. When the thickness of the resin layer 420 is less than the above range, it is difficult to provide a surface light source with uniform luminance. The upper surface of the resin layer 420 may have first adhesive strength. The upper surface of the resin layer 420 has a first adhesive force and may be adhered to the light transmitting layer 415.

The light transmitting layer 415 may be an adhesive material such as silicone or epoxy, or may include a diffusion material. The diffusion material may include at least one of polyester (PET), poly methyl methacrylate (PMMA), or poly carbonate (PC). The light transmitting layer 415 may include an adhesive region that is adhered to the upper surface of the resin layer 420 and a non-adhesive region that is not adhered to or spaced apart from the upper surface of the resin layer 420. The light transmitting layer 415 may disposed on 60% or more, for example, 80% or more of the upper surface area of the resin layer 420, and may bring the diffusion layer 430 into closed contact with the resin layer 420 or the lower diffusion layer (not shown).

The light blocking portion 425 may face the upper surface of the resin layer 420. The light blocking portion 425 may overlap the light source 100 in a vertical direction. Each of the plurality of light blocking units 425 may overlap each of the plurality of light sources 100 in a vertical direction. The light blocking portion 425 may be disposed between the resin layer 420 and the diffusion layer 430. When the diffusion layer 430 is disposed in plurality, the light blocking portion 425 may be disposed between the plurality of diffusion layers.

The light blocking portion 425 may be disposed within the light transmitting layer 415. The light blocking portion 425 may penetrate the light transmitting layer 415 and may contact at least one of the resin layer 425 or the diffusion layer 430. The light blocking portion 425 may include a gap portion 427 spaced apart from the inner surface of the light transmitting layer 415 and/or the upper surface of the resin layer 420. The gap portion 427 may provide a refractive index different from that of the light blocking portion 425, thereby improving light diffusion efficiency. The lower surface S13 of the light blocking portion 425 may be spaced apart from or not in contact with the upper surface of the lower layer, for example, the upper surface of the resin layer 420. The gap portion 427 may be an air region or a vacuum region.

As shown in FIG. 11, a distance B1 between the light blocking portions 425 may be smaller than a distance X1 between the light sources 100. The light blocking portion 425 may be spaced apart from the outer surface of the resin layer 420. A plurality of light blocking portions 425 may be arranged in one direction. The plurality of light blocking portions 425 may have the same shape. The light blocking portion 425 may be disposed on each light source 100. Each of the light blocking portions 425 may be disposed in a direction perpendicular to each light source 100 and in the surrounding region.

The light blocking portion 425 may be placed higher than the upper surface of the resin layer 420. The light blocking portion 425 may be 50% or more of the upper surface area of the light source 100, or may range from 50% to 200%. The light blocking portion 425 may be a region printed with white material. The light blocking portion 425 may be printed using, for example, a reflective ink containing any one of $TiO_2$, $Al_2O_3$, $CaCO_3$, $BaSO_4$, and Silicon. The light blocking portion 425 reflects light emitted through the emission surface of the light source 100, thereby reducing the occurrence of hot spots on the light source 100. The light blocking portion 425 may print a light blocking pattern using light blocking ink. The light blocking portion 425 may be formed by printing on the lower surface of the diffusion layer 430. The light blocking portion 425 is made of a material that does not 100% block incident light, may have a transmittance lower than a reflectance, and may perform the function of blocking and diffusing light. The light blocking portion 425 may be formed of a single layer or multiple layers, and may have the same pattern shape or different pattern shapes. The light blocking portion 425 may be formed to have the same thickness. The thickness of the light blocking portion 425 may vary depending on the region. The thickness of the light blocking portion 425 may be thickest in the center region and the edge region may be thinner than the center region. The thickness of the light blocking portion 425 may be thick in proportion to the incident luminous intensity.

The light blocking portion 425 may reduce the problem of the light source 100 being visible from the outside and hot spots in the region of the light source 100, thereby providing uniform light distribution in the entire region. The light blocking portion 425 may be arranged in a hemispherical shape, an elliptical shape, or a circular shape with respect to the light source 100.

The diffusion member 430 may be disposed between the resin layer 420 and the optical member 20. The lower surface of the diffusion member 430 may include a first portion on which the light-transmitting layer 415 is disposed and a second portion on which the light blocking portion 425 is disposed. The light blocking portion 425 may be printed on the bottom of the diffusion member 430 and may be fixed on the resin layer 420 through the light transmitting layer 415. The diffusion member 430 may include at least one of a polyester (PET) film, poly methyl methacrylate (PMMA) material, or poly carbonate (PC). The diffusion member 430 may be provided as a film made of a resin material such as silicone or epoxy. The diffusion member 430 may include a single layer or multiple layers.

The diffusion member 430 and the optical member 20 may include at least one or two of a diffusion agent such as beads, a phosphor, and ink particles. The phosphor may include, for example, at least one of red phosphor, amber phosphor, yellow phosphor, green phosphor, or white phosphor. The ink particles may include at least one of metallic ink, UV ink, or curing ink. The size of the ink particles may be smaller than the size of the phosphor. The surface color of the ink particles may be any one of green, red, yellow, and blue. In a third embodiment of the invention, light diffused by the resin layer 420 may be transmitted through the light transmitting layer 415 and radiated through the second surface S2 of the optical member 20 through the diffusion member 430. At this time, the light blocking portion 425 may prevent hot spots caused by incident light.

As shown in FIG. 12, the light blocking portion 425 of the lighting device 400 is disposed on the lower surface of the optical member 20 and may overlap the light source 100 in a vertical direction. The diffusion member 430 may be adhered to or spaced apart from the upper surface of the resin layer 420 and may be disposed below the optical member 20. As another example, the diffusion member 430 may be removed. As another example, the light blocking portion 425 may be removed, and in this case, a portion of the reflective layer 30 may overlap each of the light sources 100 in the vertical direction to perform a light blocking function.

Fourth Example

The description of the fourth embodiment may include the configurations of the first to third embodiments, and configurations that overlap with the configurations of the first to third embodiments may be omitted. The fourth embodiment may optionally include the configurations of the first to third embodiments disclosed above.

Referring to FIGS. 13 to 16a, the lighting device may include an optical member 20 on one side of the lighting module 10. The optical member 20 may be selectively included among the configurations of FIGS. 1 to 8. The lighting module 10 may include a substrate 210, a plurality of light sources 100 disposed on the substrate 210, a resin layer 220 disposed on the substrate 210 and the light emitting device 100, and a first reflective member 240 disposed on the resin layer 220. The lighting module 10 may include a second reflective member 230 between the substrate 210 and the resin layer 220 and having a side surface 232.

A plurality of the light emitting devices 100 may be arranged in one direction. The light emitting devices 100 may be arranged in one row. As another example, the light emitting devices 100 may be arranged in two or more rows and columns. The plurality of light emitting devices 100 may be arranged on a straight line or curve extending in one direction. The lighting module 10 has a line width and may be arranged in a long direction in one direction.

The light emitting device 100 may be disposed within the resin layer 220 between first and second reflective members 240 and 230 made of reflective material that face each other in the vertical direction. The first reflective member 240 may be a member of a reflective material disposed on the resin layer 220, and the second reflective member 230 may be a member of a reflective material disposed below the resin layer 220. The light emitting device 100 may be disposed closer to the second reflective member 230 than to the first reflective member 240. In the lighting module 10, each side surface may have the same thickness or the same height. The light emitting devices 100 may be sealed by a transparent resin layer, and the resin layer may be disposed between layers of reflective material or between a supporting member and a reflective layer or member.

The resin layer 220 may include a first surface S11 and a second surface S12 disposed on opposite sides. Each outer surface of the lighting module 10 may be a side of the resin layer 220 having the thickest thickness inside. The outer surface of the resin layer 220 may be arranged in a vertical direction or on the same plane as each side of the substrate 210, the second reflective member 230, and the first reflective member 240. The first and second surfaces S11 and S12 may have a long length in one direction. The first surface S11 faces the second surface S12 and may include a horizontal surface or a curved surface. The first surface S11 may be a surface in the direction in which light is emitted from the plurality of light emitting devices 100, and the second surface S12 may be a surface in a direction opposite to the direction in which light is emitted from the plurality of light sources 100.

The emission surface 111 of each of the plurality of light emitting devices 100 may face the first surface S1. Light emitted from the light emitting devices 100 may be emitted through the first surface S11, and some light may be emitted through at least one of the second surface S22 and the other side. Accordingly, a line-shaped light source may be emitted through the first surface S11 of the resin layer 220. The thickness of the first surface S11 of the resin layer 220, which is a thickness Zb of the resin layer 220, may be 3 mm or less or 2.5 mm or less. Here, a distance D2 between the light source 100 and the first surface S11 based on the light source 100 may be 3 mm or less, for example, in the range of 1 mm to 3 mm.

The first surface S11 of the resin layer 220 may be an emission surface through which light emitted from the light emitting device 100 is emitted. The first surface S11 may be the front or a non-emitting surface, and the second surface S12 may be a rear or non-emitting surface. The first surface S11 may be a flat plane. As another example, a plurality of patterns may be provided as shown in FIG. 13, and the first surface S11 may refract and emit light through a plurality of patterns corresponding to each light emitting device 100. Each of the light emitting devices 100 may be provided in a package that includes a reflective sidewall, such as a body, surrounding the outside of the light emitting chip. The package may be a side view type package. As another example, the light source 100 may be implemented as an LED chip.

The second reflective member 230 may be disposed between the resin layer 220 and the substrate 210. The resin layer 220 may be disposed in the region between the first and second reflective members 240 and 230. The first and second reflective members 240 and 230 may have the same area and face the upper and lower surfaces of the resin layer 220. Accordingly, the resin layer 220 diffuses the light emitted from the light emitting device 100 and the light reflected by the first and second reflective members 240 and 230, and guides and emits the light in the direction of the first surface S11.

The first and second reflective members 240 and 230 may be formed as a single-layer or multi-layer structure. The second reflective member 230 may include a material that reflects light, such as a metal or non-metallic material. When the first and second reflective members 240 and 230 are metal, a metal layer such as stainless steel, aluminum (Al), or silver (Ag) may be included, and when the first and second reflective members 240 and 230 are metal, a white resin material or a plastic material may be included. The first and second reflective members 240 and 230 may be made of white resin or polyester (PET). The first and second reflective members 240 and 230 may include at least one of a low-reflection film, a high-reflection film, a diffuse reflection film, or a regular reflection film. For example, the second reflective member 230 may be provided as a regular reflection film for reflecting incident light to the first surface S11. The first reflective member 240 may be made of the same material as the second reflective member 230. The first reflective member 240 may be made of a material with a higher light reflectance or may have a greater thickness than the material of the second reflective member 230 in order to reflect light and reduce light transmission loss.

As shown in FIG. 16a, the lighting device is an example when the curved lighting module 10 is applied to a vehicle lamp. The lighting module 10 may be provided in a curved shape based on a horizontal straight line X0. When applied to a vehicle ramp, it may be combined into a curved ramp shape extending the rear (or front) and sides of the vehicle. The lighting module 10 may have an angle G1 in the range of 10 to 60 degrees between the straight line X0 and the virtual straight line X2 connecting both ends of the first surface S11, and may have an angle G2 in the range of 5 degrees to 30 degrees between a virtual straight line X3 extending in the tangential direction and the first side surface S11 disposed at one end of the lighting module 201. The virtual line connecting the adjacent light sources 100 in the lighting module 10 may include a straight line, a diagonal line, or a curved line.

The optical member 20A disclosed above may be disposed on the first surface S11, which is the exit surface of the lighting module 10. Here, in the optical member 20A, the reflective layer 30 may be arranged in the pattern 22 (defined as a first pattern layer) and the first surface S1 shown in FIG. 1 in a region adjacent to the horizontal straight line X0 or on one side of the lighting module 10, and the reflective layer 30 may be arranged in the pattern 22A (defined as a second pattern layer) shown in FIG. 6 and the first surface S6. Here, the inclination angle of the first surface S6 of the optical member 20A disposed on the other side of the lighting module 10 may gradually increase as it moves toward one side of the lighting module 10, for example, from 30 degrees to 60 degrees.

The light emitted from one side of the lighting device may have a higher frontal light distribution, and the light emitted from the other side may have a higher side light distribution. At this time, the lateral light distribution is a position measured at around 75 degrees in one direction based on the optical axis.

In the optical member 20A, the first surfaces S6 of each pattern of the second pattern layer 22A may have the same inclination angle on the other side La facing the curved surface of the lighting module 10, and the first surfaces S1 of each pattern of the first pattern layer 22 on one side of the lighting module 10 may have the same inclination angles and greater than the other side inclination angle. When such a lamp is turned on as shown in FIG. 21, the lighting device 800 having the disclosed optical member 20 is not irradiated with all light through the vertical direction Y20, and the light having the highest luminous intensity may be extracted through the direction Y22 between the vertical direction Y20 and the horizontal straight line L1. Accordingly, the lamps disposed at the corners between the rear and the side of the vehicle lamp may provide light that satisfies vehicle regulations in the rear direction.

In the lighting device, each pattern of the first pattern layer 22 may be arranged in plural numbers from one side to the other side of the optical member 20A, and each pattern of the second pattern layer 22A may be arranged in plural numbers from the other side toward one side of the optical member 20A. In a region between the first and second pattern layers 22 and 22A, intermediate patterns having an inclination angle of the first surface between the inclination angle of the first surface S1 of each pattern of the second pattern layer 22A and the inclination angle of the first surface S1 of each pattern of the first pattern layer 22 may be disposed. Accordingly, light may be extracted from the entire area of the lamp toward a specific direction, such as the front or rear direction, rather than the side direction.

As shown in FIG. 16a, the optical member 20A may have a region including the pattern layer 22 of FIGS. 1 and 4 among the pattern layers of FIGS. 1, 4, and 6, the pattern layers 22 of FIGS. 1 and 6, the pattern layers 22 and 22A of FIGS. 4 and 6, or the pattern layers 22 and 22A of FIGS. 1, 4 and 6. As an example, as shown in FIG. 16b, the plurality of patterns of the optical member 20C may have two or more regions A1, A2, and A3 where the angle formed by the first surface S21 and the second surface S22 is different. The regions A1, A2, and A3 may include a first region A1 where the angle is the first angle R5, a second region A2 where the second angle R2, and a third region A3 changed from first angle R5 to the second angle R6. The first region A1 is a region with the highest luminous intensity of the front light distribution, the second region A2 is a region with the highest luminous intensity of the side light distribution, and the third region A3 may be a region with the highest luminous intensity of the light distribution in the middle portion (50 degrees to 70 degrees) between the front and the side. The first angle may be larger than the second angle. Additionally, the plurality of patterns may include regions where the length of the short axis of the first surface S21 is different from the length of the short axis of the second surface S21. Accordingly, the optical member 20C may increase the luminous intensity of light extracted from the light emission side toward a specific direction or different directions.

Fifth Embodiment

The fifth embodiment shown in FIG. 17 refers to the configurations of the first to fourth embodiments and may optionally include the configurations of the first to fourth embodiments.

Referring to FIG. 17, the lighting device may include a lighting module 10 and a pattern layer 17A formed integrally. Each pattern of the pattern layer 17A is arranged on the upper portion of the resin layer 17 of the lighting module 10, and in the pattern layer 17A, a first surface S1 and a second surface S2 of each pattern may be arranged alternately. A reflective layer 30 may be disposed on the first surface S1. The concave portion 17B between the first and second surfaces S1 and S2 may have an inverted triangle shape. The light source 13 disposed in the resin layer 17 may be in the form of a package having an LED chip or may be implemented with an LED chip, and the description of the embodiment disclosed above will be referred to. Here, the reflective layer 30 may be formed to a size that covers a region that overlaps the light source 13 in a vertical direction or a region with high luminous intensity (hot spot region). In this case, the reflective layer 30 may overlap two or more patterns that overlap in a vertical direction with the light source 13.

Sixth Example

The sixth embodiment shown in FIG. 18 may optionally include the configurations of the first to fourth embodiments. Referring to FIG. 18, the lighting device may include a plurality of optical members each disposed on at least two of the sides of the lighting module 10. For example, the plurality of optical members may include a first optical member 20 disposed on one side of the lighting module 10 and a second optical member 20A on the other side. The first and second optical members 20 and 20A may be optionally included among the configurations of FIGS. 1 to 8, and reference numeral 20 is referred to as the first optical member for convenience of explanation.

The lighting module 10 may include a resin layer 19, which is a light guide member, and a light source 13B disposed on one side of the resin layer 19. The light source 13B may be disposed on the substrate 11 and may face the side of the resin layer 19 or may be embedded further inward than the side. The light incident on the resin layer 19 may be emitted through the upper surface S31 and the lower surface S32. In this case, the upper surface S31 and the lower surface S32 may have a light extraction pattern disposed thereon.

The first and second optical members 20 and 20A may include each pattern of the pattern layer 22 disclosed above and a reflective layer 30 on the first surface S1. The reflective layer 30 may be disposed on the first surface S1 inclined in the same direction with respect to a straight line perpendicular to the optical axis of the light source 13B. As another example, the reflective layer 30 may be disposed in different directions or on different inclined surfaces S1 and S2 in the first and second optical members 20 and 20A, respectively. When viewed from the outside, this lighting device may improve light distribution in the front direction or optical axis direction when the light is turned on, and can improve visibility through a reflective layer when the lighting is not turned on.

FIG. 19 is a plan view of a vehicle to which a vehicle lamp is applied with a lighting device according to an embodiment, and FIG. 20 is a diagram showing a lighting device or a vehicle lamp with a lighting device disclosed in an embodiment.

Referring to FIGS. 19 and 20, in the moving object or vehicle 900, the front lamp 850 may include one or more lighting modules, and the operating timing of these lighting modules is individually controlled to function as a typical headlamp as well as, when the driver opens the vehicle door, additional functions such as welcome lights or celebration effects may be provided. The lamp may be applied to daytime running lights, high beams, low beams, fog lights, or turn signal lights.

In the vehicle 900, the rear lights 800 may be arranged as a plurality of lamp units 810, 812, 814, and 816 supported by the housing 801. For example, the lamp units 810, 812, 814, and 816 may include a first lamp unit 810 disposed on the outside, a second lamp unit 814 disposed around the inside of the first lamp unit 810, and third and fourth lamp units 814 and 816 respectively disposed inside of the second lamp unit 814. The first to fourth lamp units 810, 812, 814, and 816 may selectively apply the lighting device disclosed in the embodiment, and a red lens cover or a white lens cover may be disposed on the outside of the lighting device for the lighting characteristics of the lamp units 810, 812, 814, 8 and 16). The lighting device disclosed in the embodiment applied to the lamp units 810, 812, 814, and 816 may irradiate surface light at a higher luminous intensity in a specific direction.

The first and second lamp units 810 and 812 may be provided in at least one of a curved shape, a straight shape, an angled shape, an inclined shape, or a flat shape, or a mixed structure thereof. The first and second lamp units 810 and 812 may be arranged one or more in each taillight. The first lamp unit 810 may be provided as a tail light, the second lamp unit 812 may be provided as a brake light, and the third lamp unit 814 may be provided as a reverse light. The fourth lamp unit 816 may be provided as a turn signal lamp.

The invention claimed is:

1. A lighting device comprising:
   a substrate;
   a plurality of light sources disposed on the substrate;
   a resin layer disposed on the substrate and sealing plurality of light sources; and
   an optical member disposed on the resin layer,
   wherein the optical member includes a base layer, a pattern layer disposed on the base layer, and a reflective layer disposed on the pattern layer,
   wherein the pattern layer includes a plurality of patterns having a first surface and a second surface extending from the first surface,
   wherein the reflective layer is disposed on the first surface,
   wherein the plurality of patterns includes a region where an angle between the first surface and the second surface is different,
   wherein the optical member includes at least one of phosphor or ink particles,
   wherein the region of the plurality of patterns includes a first region in which the angle formed by the first surface and the second surface is a first angle, a second region in which the angle formed by the first surface and the second surface is a second angle, and a third region having a third angle between the first angle and the second angle,
   wherein the first region is a region with a highest luminous intensity of front light distribution,
   wherein the second region is a region with a highest luminous intensity of side light distribution, and
   wherein the third region is disposed between the first region and the second region, and has a highest light distribution in a direction between a front and a side.

2. The lighting device of claim 1,
   wherein light emitted through the second surface is red light.

3. The lighting device of claim 1,
   wherein the first angle is greater than the second angle.

4. The lighting device of claim 1,
   wherein the plurality of patterns includes a region where a length of a short axis of the first surface is different from that of a short axis of the second surface.

5. A lighting device comprising:
   a substrate;
   a light source disposed on the substrate;
   a resin layer disposed on the substrate; and
   an optical member disposed on the resin layer,
   wherein the optical member includes a base layer, a pattern layer disposed on the base layer, and a reflective layer disposed on the pattern layer,
   wherein the pattern layer includes a plurality of patterns having a first surface and a second surface extending from the first surface,
   wherein the reflective layer is disposed on the first surface, and
   wherein a shape of light emitted through the pattern layer is different from a first shape viewed from a first direction and a second shape viewed from a second direction.

6. The lighting device of claim 5,
   wherein the first direction is a direction perpendicular to a lower surface of the base layer, and the second direction is 45 degrees on one side based on the first direction,
   wherein a luminous intensity of a third shape viewed from a third direction forming 45 degrees on another side with respect to the first direction is different from a luminous intensity of the first shape,
   wherein the first shape has the same outer image of 80% or more as the third shape.

7. The lighting device of claim 5,
   wherein the first direction is a direction perpendicular to a lower surface of the base layer,
   wherein the second direction is 45 degrees on one side based on the first direction,
   wherein a third direction is 45 degrees to another side based on the first direction,
   wherein the second direction is a direction facing the reflective layer,
   wherein the third direction is a direction facing the second surface,
   wherein the second shape includes a line shape equal to a width of an exit side of the resin layer.

8. The lighting device of claim 5,
   wherein the reflective layer is made of a metal material, and the second surface is made of a light transmitting material.

9. The lighting device of claim 5,
   wherein an exit surface of the resin layer facing the optical member is flat or curved,
   wherein each pattern of the pattern layer has a different height of a pattern adjacent to one side of the optical member and a height of a pattern adjacent to the other side.

10. The lighting device of claim 5,
    wherein the optical member includes at least one of a phosphor or ink particles.

11. The lighting device of claim 5,
    wherein the optical member includes at least one of a red phosphor or red ink particles.

12. The lighting device of claim 11,
    wherein light emitted through the second surface of the pattern layer is red.

13. The lighting device of claim 1, comprising:
    a diffusion member disposed between the resin layer and the optical member; and
    a light blocking portion disposed between the diffusion member and the resin layer and overlapping the plurality of light sources in a vertical direction,
    wherein the diffusion member includes at least one of a diffusing agent, an ink particle, or a phosphor.

* * * * *